US011996224B2

(12) United States Patent

Chiba et al.

(10) Patent No.: US 11,996,224 B2

(45) Date of Patent: May 28, 2024

(54) METHOD FOR MANUFACTURING A POWDER CORE, THE POWDER CORE AND AN INDUCTOR

(71) Applicant: TOKIN CORPORATION, Sendai (JP)

(72) Inventors: Miho Chiba, Sendai (JP); Akiri Urata, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 190 days.

(21) Appl. No.: 16/651,131

(22) PCT Filed: Sep. 21, 2018

(86) PCT No.: PCT/JP2018/035066

§ 371 (c)(1),
(2) Date: Mar. 26, 2020

(87) PCT Pub. No.: WO2019/065500

PCT Pub. Date: Apr. 4, 2019

(65) Prior Publication Data

US 2020/0238374 A1 Jul. 30, 2020

(30) Foreign Application Priority Data

Sep. 29, 2017 (JP) ................................. 2017-190682

(51) Int. Cl.
*H01F 17/04* (2006.01)
*B22F 1/054* (2022.01)
(Continued)

(52) U.S. Cl.
CPC .............. *H01F 17/04* (2013.01); *B22F 1/054* (2022.01); *B22F 1/07* (2022.01); *B22F 1/10* (2022.01);
(Continued)

(58) Field of Classification Search
CPC .... B22F 1/054; B22F 1/10; B22F 3/02; B22F 3/24; B22F 2003/248; B22F 2301/35;
(Continued)

(56) References Cited

U.S. PATENT DOCUMENTS 8,282,745 B2 10/2012 Tsuchiya et al.
9,704,627 B2 7/2017 Kato et al.
(Continued)

FOREIGN PATENT DOCUMENTS

CN 102007549 A 4/2011
CN 102264938 A 11/2011
(Continued)

OTHER PUBLICATIONS

JP-2016211017-A: Espacenet English machine translation (Year: 2016).*

(Continued)

*Primary Examiner* — Adil A. Siddiqui
(74) *Attorney, Agent, or Firm* — Holtz, Holtz & Volek PC

(57) ABSTRACT

This method for manufacturing a powder core is provided with: a step for heat-treating amorphous soft magnetic alloy powder to obtain nanocrystal powder; a step for obtaining granulated powder from nanocrystal powder, malleable powder, and a binder; a step for pressure-molding the granulated powder to obtain a green compact; a step for curing the binder by heat-treating the green compact at a temperature which is equal to or higher than the curing initiation temperature of the binder and lower than the crystallization initiation temperature of the amorphous soft magnetic alloy powder.

12 Claims, 3 Drawing Sheets

(51) Int. Cl.

| | |
|---|---|
| ***B22F 1/07*** | (2022.01) |
| ***B22F 1/10*** | (2022.01) |
| ***B22F 3/02*** | (2006.01) |
| ***B22F 3/24*** | (2006.01) |
| ***H01F 1/153*** | (2006.01) |
| ***H01F 1/24*** | (2006.01) |

(52) U.S. Cl.

CPC .................. *B22F 3/02* (2013.01); *B22F 3/24* (2013.01); *H01F 1/153* (2013.01); *H01F 1/24* (2013.01); *B22F 2003/248* (2013.01); *B22F 2301/35* (2013.01); *B22F 2304/054* (2013.01)

(58) Field of Classification Search

CPC .. B22F 2304/054; B22F 1/07; B22F 2998/10; H01F 1/153; H01F 1/24; H01F 17/04; H01F 1/15333; H01F 41/0246; H01F 2017/048; C22C 33/0278; C22C 2200/02; C22C 2200/04; C22C 2202/02; C22C 38/00

See application file for complete search history.

(56) References Cited

U.S. PATENT DOCUMENTS

| | | | | |
|---|---|---|---|---|
| 9,767,956 | B2 | 9/2017 | Otsuka et al. | |
| 9,818,519 | B2 | 11/2017 | Miyamura et al. | |
| 10,312,004 | B2 | 6/2019 | Kato et al. | |
| 2011/0024670 | A1 | 2/2011 | Otsuki et al. | |
| 2014/0138569 | A1* | 5/2014 | Otsuka | H01F 27/255 252/62.54 |
| 2014/0138570 | A1 | 5/2014 | Otsuka et al. | |
| 2015/0162118 | A1 | 6/2015 | Kato et al. | |
| 2015/0243420 | A1 | 8/2015 | Miyamura et al. | |
| 2017/0271063 | A1 | 9/2017 | Kato et al. | |
| 2018/0169759 | A1* | 6/2018 | Nakamura | H01F 1/15333 |
| 2018/0361474 | A9 | 12/2018 | Nakamura et al. | |

FOREIGN PATENT DOCUMENTS

| | | | |
|---|---|---|---|
| JP | 2654944 | B2 | 1/1987 |
| JP | H07034183 | A | 2/1995 |
| JP | 2001015320 | A | 1/2001 |
| JP | 2004363466 | A | 12/2004 |
| JP | 2006179621 | A | 7/2006 |
| JP | 2006294733 | A | 10/2006 |
| JP | 2006294775 | A | 10/2006 |
| JP | 2007134381 | A | 5/2007 |
| JP | 2012136770 | A | 7/2012 |
| JP | 2014075528 | A | 4/2014 |
| JP | 2014090152 | A | 5/2014 |
| JP | 2014103265 | A | 6/2014 |
| JP | 2014103266 | A | 6/2014 |
| JP | 2014175580 | A | 9/2014 |
| JP | 2015201481 | A | 11/2015 |
| JP | 2016211017 | A * | 12/2016 |
| JP | 6088284 | B2 | 2/2017 |
| JP | 6101034 | B2 | 3/2017 |
| JP | 2017043842 | A | 3/2017 |
| WO | 2013108735 | A1 | 7/2013 |
| WO | 2014054430 | A1 | 4/2014 |
| WO | 2017022227 | A1 | 2/2017 |

OTHER PUBLICATIONS

International Search Report dated Dec. 11, 2018 (and English translation thereof) issued in International Application No. PCT/JP2018/035066.

Written Opinion of the International Search Authority dated Dec. 11, 2018 issued in International Application No. PCT/JP2018/035066.

Chinese Office Action (and English language translation thereof) dated Jun. 7, 2021, issued in counterpart Chinese Application No. 201880061731.3.

Chinese Office Action (and English language translation thereof) dated Dec. 27, 2021, issued in counterpart Chinese Application No. 201880061731.3.

Japanese Office Action (and English language translation thereof) dated Jan. 5, 2022, issued in a related Japanese Application No. 2019-545063.

* cited by examiner

METHOD FOR MANUFACTURING A POWDER CORE, THE POWDER CORE AND AN INDUCTOR

TECHNICAL FIELD

The present invention relates to a method for manufacturing a powder core, the powder core and an inductor.

BACKGROUND ART

Recent progress to meet demands of small sizing, weight reduction and speeding up of the electric device or the electronic device is amazing. Therefore, there is a demand of a higher saturation magnetic flux density and a higher permeability for a magnetic material used in the electric device or the electronic device. Then, various techniques are known to obtain a soft magnetic alloy powder having a high saturation magnetic flux density and a high permeability and a powder core made by using the soft magnetic alloy powder.

For example, Patent Document 1 discloses a composite powder core material made of an amorphous alloy magnetic powder and an iron powder. Patent Document 2 discloses a soft magnetic mixed powder made of a soft magnetic iron-based alloy powder and a pure iron powder. Patent Document 3 discloses a powder core in which Cu is dispersed in a soft magnetic material powder. Patent Document 4 discloses a method for manufacturing a powder core using a first soft magnetic alloy powder material (an amorphous powder) and a second soft magnetic alloy powder material (an amorphous powder, a crystalline magnetic powder or a nanocrystallized powder). Furthermore, Patent Document 5 discloses a powder for a core which includes a soft magnetic metal powder and a pure iron powder.

PRIOR ART DOCUMENTS

Patent Document(s)

Patent Document 1: JP1995-034183A
Patent Document 2: JP6088284B
Patent Document 3: JP2014-175580A
Patent Document 4: JP6101034B
Patent Document 5: JP2017-043842A

SUMMARY OF INVENTION

Technical Problem

Any of the composite powder core materials or the like disclosed in Patent Documents 1 to 5 needs to be applied with a heat-treatment at a relatively high temperature to cause nanocrystallization after it is turned to a green compact by pressure-molding. According to such heat-treatment, heat is easy to stay inside the green compact. Therefore, formation state of nanocrystal may become uneven, crystal grains may grow roughly and much compounds may be formed in large quantities. As a result, magnetic properties of a powder core may be deteriorated. And such heat-treatment has problems of restricting binders usable for manufacturing a powder core and deteriorating a coil wire rod which is united with the powder core.

It is, therefore, an object of the present invention to provide a method for manufacturing a powder core which can achieve desirable properties without heat-treatment at a relatively high temperature after pressure-molding.

Solution to Problem

An aspect of the present invention provides, as a first method for manufacturing a powder core. The method comprises heat-treating an amorphous soft magnetic alloy powder to obtain a nanocrystal powder; obtaining a granulated powder from the nanocrystal powder, a malleable powder and a binder; pressure-molding the granulated powder to obtain a green compact; and curing the binder by heat-treating the green compact at a temperature which is equal to or higher than the curing initiation temperature of the binder and lower than the crystallization initiation temperature of the amorphous soft magnetic alloy powder.

Moreover, according to another aspect of the present invention, as a first core, a powder core which is manufactured by the first method for manufacturing the powder core is obtained. In the powder core, when assuming a cross-section which divides the powder core in half, the cross section has a cross sectional area of 10 $mm^2$ or more. In the cross section, a crystal grain diameter ratio of a nanocrystal positioned at a depth of 0.1 mm from a surface of the powder core to a nanocrystal positioned at a center of the powder core is less than 1.3.

In addition, according to still another aspect of the present invention, an inductor comprising the first powder core and a coil built in the powder core is obtained.

Advantageous Effects of Invention

In the method for manufacturing the powder core of the present invention, just needs heat-treatment at a relatively low temperature which is necessary to cure the binder of the green compact. Accordingly, deterioration of magnetic properties and deterioration of a coil wire rod which are caused by heat-treatment at a relatively high temperature can be suppressed, and a powder core having required properties and an inductor including the powder core can be obtained. Moreover, choices of binders usable for manufacturing the powder core is increased.

An appreciation of the objectives of the present invention and a more complete understanding of its structure may be had by studying the following description of the preferred embodiment and by referring to the accompanying drawings.

DESCRIPTION OF EMBODIMENTS

Figure 1:
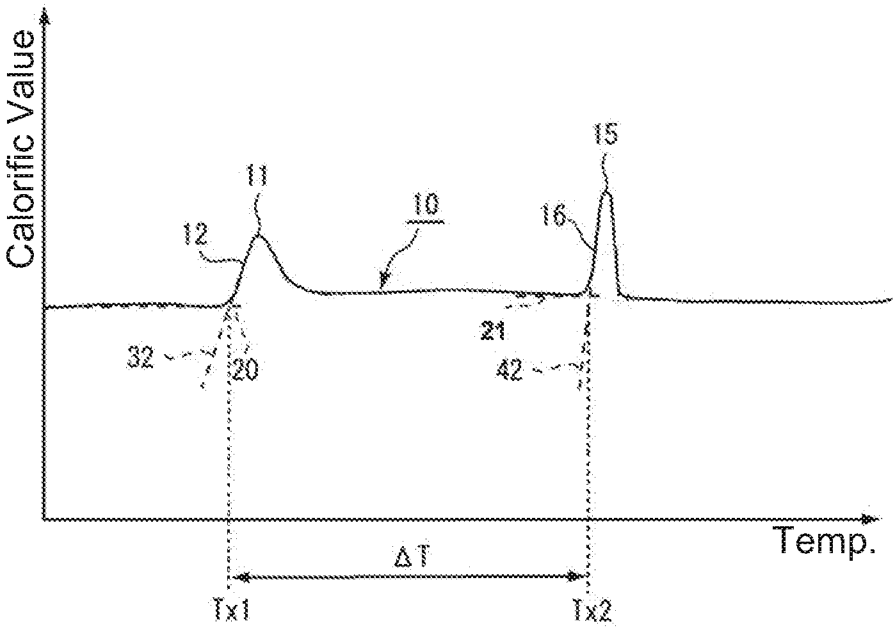
FIG. 1 is a graph showing a DSC measurement result of an amorphous soft magnetic alloy powder used in a method for manufacturing a powder core according to an embodiment of the present invention.

While the invention is susceptible to various modifications and alternative forms, a specific embodiment thereof is shown by way of an example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First, referring to FIG. 1, the description will be made about properties of an amorphous soft magnetic alloy powder (hereinafter refer to as an amorphous powder) used in a manufacturing method of a powder core according to an embodiment of the present invention. FIG. 1 shows a differential scanning calorimetry (DSC) curve 10 obtained in a case where the amorphous powder used in the present embodiment is continuously heated to be at a predetermined temperature increase rate. The DSC curve 10 of FIG. 1 has two exothermic peaks 11 and 15. The lower temperature side peak among these exothermic peaks is a peak which appears in connection with formation of bccFe crystal (nanocrystal). The higher temperature side peak is a peak which appears in connection with formation of compounds (Fe—B based compound, Fe—P based compound or the like) to be impurities. Here, a temperature defined by an intersection of a base line 20 and a first rising tangent 32 (a tangent passing a point which has a largest positive inclination among a first rising edge portion 12) is referred to as a first crystallization initiation temperature Tx1. Moreover, a temperature defined by an intersection of a base line 21 and a second rising tangent 42 (a tangent passing a point which has a largest positive inclination among a second rising edge portion 16) is referred to as a second crystallization initiation temperature Tx2.

As understood from FIG. 1, compounds are formed when the amorphous powder is heat-treated at a relative high temperature. The formed compounds (impurities) do not deteriorate magnetic properties of the powder core if the amount thereof is very small but deteriorate the magnetic properties if the amount thereof is large. Accordingly, in the heat-treatment of the amorphous powder, formation of the compounds must be avoided as much as possible. In other words, it is desirable that a heat-treatment temperature for the amorphous powder be as low as possible. Additionally, the first crystallization initiation temperature Tx1 and the second crystallization initiation temperature Tx2 depend on composition or the like of the amorphous powder. A soft magnetic material selected to realize a high saturation magnetic flux density Bs usually contains Fe as a main component. The first crystallization initiation temperature Tx1 of a soft magnetic material (an amorphous powder) including having a main component of Fe is usually equal to 300° C. or more.

Figure 2:
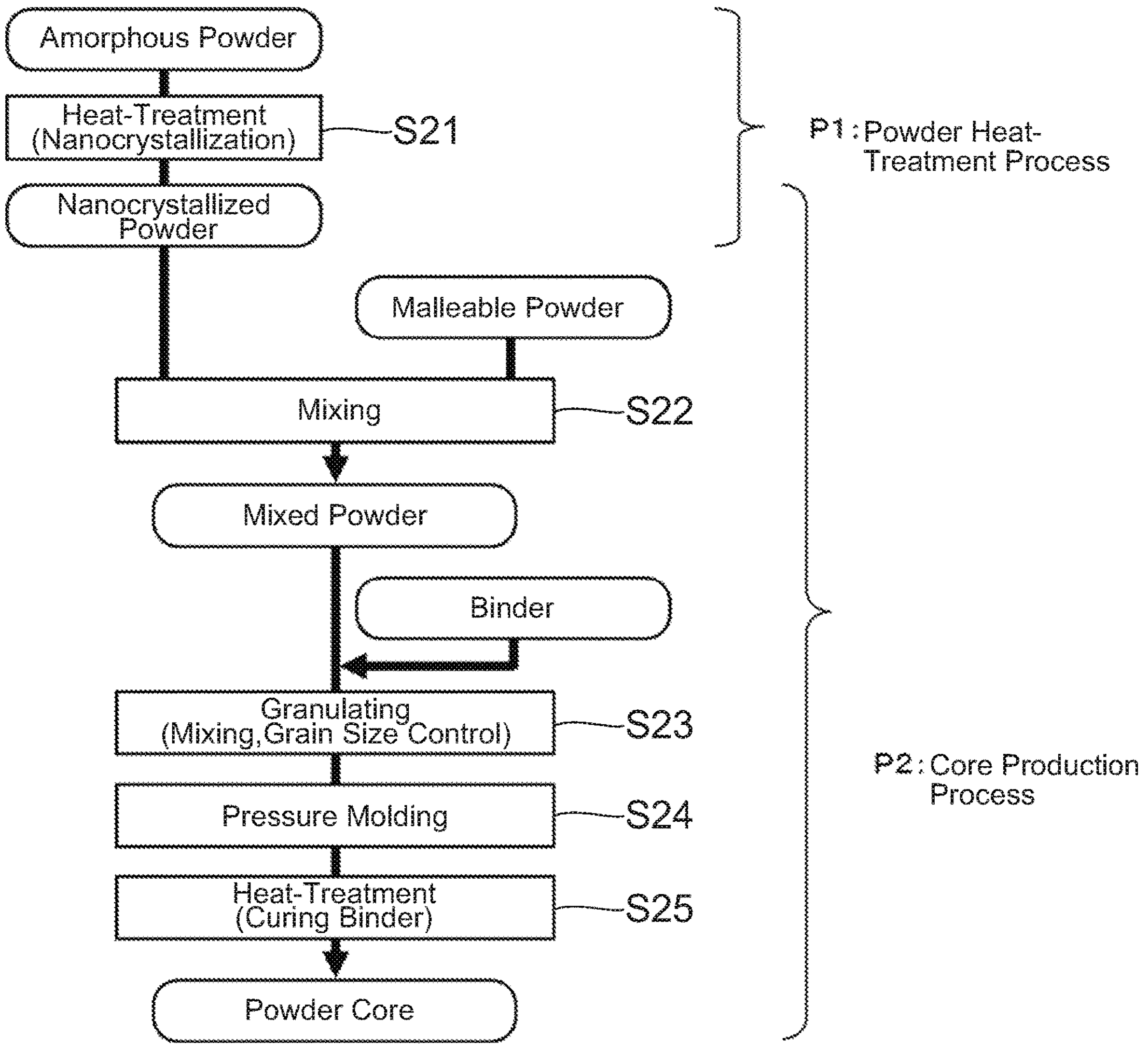
FIG. 2 is a flowchart for describing the method for manufacturing the powder core according to the embodiment of the present invention.

Next, referring to FIG. 2, the description will be made about the method for manufacturing the powder core according to the embodiment of the present invention. The method for manufacturing the powder core shown in FIG. 2 is composed of, roughly speaking, a powder heat-treatment process P1 and a core production process P2.

First, in step S21 of the powder heat-treatment process P1, heat-treatment is carried out under a predetermined temperature condition to obtain a nanocrystal (nanocrystallized) powder in which nanosized fine crystals (nanocrystals) are formed. Since the formation of the nanocrystals is influenced by a heat-treatment time or the like, the formation of the nanocrystals may occur at a temperature lower than the crystallization initiation temperature (Tx1). This heat-treatment is usually carried out at a temperature equal to or higher than "the first crystallization initiation temperature Tx1—50° C." and less than "the second crystallization initiation temperature Tx2" in order to form nanocrystals appropriately and suppress forming compounds. In the heat-treatment, common heating equipment of an electric type, such as resistor heating, induction heating, laser heating and infrared light heating, or a combustion type, can be used. As a processing system, common equipment, such as a batch type, a continuous type using a roller or a conveyer and a rotary type, can be used. Moreover, an atmosphere at a time of the heat-treatment is desirable to be an inactive atmosphere to suppress surface oxidation of the powder. However, an oxidation atmosphere such as an air or a reduction atmosphere such as hydrogen can be used for a specific object.

Next, proceeding to the core production step P2, in step S22, a malleable powder is added to the nanocrystal powder obtained in the step S21 to be sufficiently mixed and to obtain a mixed powder. After then, in step S23, the mixed powder and a binder are mixed, and the obtained mixture is controlled in grain size to obtain a granulated powder. Next, in step S24, the granulated powder is pressure-molded using a mold to obtain a green compact. Finally, in step S25, the green compact is heat-treated to cure the binder. Although this heat-treatment is carried out at a temperature equal to or higher than a curing initiation temperature of the binder, it is carried out at the temperature as low as possible not to cause further crystallization (progress of crystallization) of the nanocrystal powder. In this manner, the powder core is produced. Additionally, an atmosphere at a time of the heat-treatment is desirable to be an inactive atmosphere to suppress surface oxidation of the powder. However, an oxidation atmosphere such as air may be used for the specific object such as control for curing reaction of the binder.

Here, for comparison, a conventional method for manufacturing a powder core will be described with reference to FIG. 3. First, in step S31, a malleable powder is added to an amorphous powder to be sufficiently mixed and to obtain a mixed powder. After then, in step S32, the mixed powder and a binder are mixed and further controlled in grain size to obtain a granulated powder. As the binder to be used, in consideration of heat-treatment temperature after molding, a binder, such as silicone-based, having high heat resistance and good insulation performance is used. After that, in step S33, the granulated powder is pressure-molded using a mold to produce a green compact. Finally, in step S34, the green compact is heat-treated in an inactive atmosphere to cure the binder and to nanocrystallize the amorphous powder, and a powder core is obtained.

As mentioned above, in the conventional method shown in FIG. 3, the heat-treatment is carried out at the relatively high temperature for nanocrystallization after the pressure-molding. The temperature at which the nanocrystals are formed is usually equal to 300° C. or more as mentioned above. Therefore, in this method, a binder having low heat resistance cannot be used. Moreover, since the nanocrystallization reaction is exothermic reaction, heat is easy to stay inside the green compact (the core). Therefore, a nanocrystal formation state becomes uneven, grains coarse, and furthermore compounds are formed in large quantities by thermal runaway. As a result, magnetic properties are deteriorated. Deterioration of such magnetic properties becomes remarkable when a powder core having a cross sectional area of 10 $mm^2$ or more is produced. Particularly, deterioration of the magnetic properties is large when, in a cross section of the powder core, a ratio (a crystal grain diameter ratio (center/ surface)) of a grain diameter of a nanocrystal positioned at the center of the cross section to a grain diameter of a nanocrystal positioned at a position apart from a surface of the core by 0.1 mm is over 1.3. Additionally, the nanocrystal grain diameter on the cross section of the powder core can be found by structure observation using an electron microscope. The cross section of the powder core can be formed by embedding the powder core into a cold resin, curing the cold resin and polishing them. In the present embodiment, a plane dividing the powder core in half is assumed as the cross section. The crystal grain diameter may be the mean value calculated by randomly selecting crystal grains of 30 or more from predetermined positions in a structure photograph of the powder core cross section and measuring the major axis and the miner axis of each of the grains. The predetermined positions are at the center of the cross section and a vicinity thereof or on a line apart from the surface by 0.1 mm.

In the method for manufacturing the powder core according to the present embodiment, the soft magnetic powder previously nanocrystallized is used together with the malleable powder. Since the heat-treatment is carried out for a powder state, ununiformity of thermal distribution and thermal runaway caused in a case where the green compact is heat-treated are hard to be caused. Moreover, because of adding the malleable powder, it is possible to reduce stress caused in the nanocrystal powder at a time of pressure-molding and to suppress deterioration of magnetic properties of the nanocrystal powder. Furthermore, heat-treatment after pressure-molding is carried out at a temperature required to cure the binder so as not to cause or promote crystallization, thereby solving problems caused by heat-treatment at relative high temperature. Specifically, ununiformity of nanocrystal structure caused inside a core by heat-treatment at a high temperature is suppressed, and occurrence of thermal runaway is also suppressed. Accordingly, it becomes possible to use a material having large calorific power (high content rate of Fe), and a high magnetic flux saturation density Bs can be realized. Moreover, it becomes possible to produce a larger powder core, or it becomes possible to produce a powder core having a higher packing factor (a smaller size). Thus, according to the present embodiment, it is possible to produce a duct core having a high magnetic flux saturation density and excellent magnetic properties including little core loss. Furthermore, since the heat-treatment temperature is low, choices for a bonding are increased, and deterioration of a coil wire rod can be prevented.

Hereinafter, referring to FIG. 2, the method for manufacturing the powder core according to the present embodiment will be described in more detail.

First, in step S21, the heat-treatment is applied to the amorphous powder to form the nanocrystals. The amorphous powder to be used is an alloy powder represented by a composition formula of $Fe_{(100-a-b-c-x-y-z)}Si_aB_bP_cCr_xNb_yCu_z$ and meeting 0≤a≤17 at %, 2≤b≤15 at %, 0≤c≤15 at %, 0·x+y≤5 at % and 0.2≤z≤2 at %. The amorphous powder can be produced by a known method. For example, the amorphous powder can be produced by an atomize method. Alternately, the amorphous powder may also be produced by pulverizing an alloy strip.

In the amorphous powder, Fe is a principle element and an essential element responsible for magnetism. In order to improve the saturation magnetic flux density and reduce material costs, it is basically preferable that Fe content is much.

In the amorphous powder, Si is an element responsible for forming an amorphous phase. Si is not necessarily to be included, but adding it broadens ΔT to enable stable heat-treatment. Here, ΔT is a difference between the first crystallization initiation temperature Tx1 and the second crystallization initiation temperature Tx2 (see FIG. 1). However, when Si content is more than 17 at %, amorphous forming ability decreases and thereby a powder having a principle phase of amorphous cannot be obtained.

In the amorphous powder, B is an essential element responsible for forming the amorphous phase. When B content is less than 2 at %, formation of the amorphous phase becomes difficult, and the soft magnetic properties after the heat-treatment decrease. On the other hand, when B content is more than 15 at %, a melting point becomes high, which is not preferable in production, and the amorphous forming ability decrease.

In the amorphous powder, P is an element responsible for forming an amorphous phase. Addition of P facilitates formation of nanocrystal structure which is fine and uniform and good magnetic properties can be achieved. When P content is more than 15 at %, balance with other metalloid elements becomes worse so that the amorphous forming ability decreases and that, at the same time, the saturation magnetic flux density Bs decreases remarkably.

In the amorphous powder, Cr and Nb may not necessarily be included. However, addition of Cr forms oxide films on powder surfaces to improve corrosion resistance. Moreover, addition of Nb has an effect of suppressing growth of bcc crystal grains on nanocrystallization, and fine nanocrystal structure becomes easy to be formed. However, addition of Cr and Nb reduces Fe amount relatively so that the saturation magnetic flux density Bs decreases and that the amorphous forming ability decreases. Accordingly, it is preferable that Cr and Nb are equal to 5 wt % or less in total.

In the amorphous powder, Cu is an essential element contributing to fine crystallization. When Cu content is less than 0.2 at %, cluster formation is poor at the heat-treatment for nanocrystallization, and uniform nanocrystallization is difficult. On the other hand, when Cu content exceeds 2 at %, the amorphous forming ability decreases, and it is difficult to obtain a powder with high amorphous property.

In the amorphous powder, it is preferable to substitute one or more elements selected from Co, Ni, Zn, Zr, Hf, Mo, Ta, W, Ag, Au, Pd, K, Ca, Mg, Sn, Ti, V, Mn, Al, S, C, O, N, Bi and rear-earth elements for a part of Fe. Inclusion of such elements facilitates uniform nanocrystallization after the heat-treatment. However, in this substitution, it is necessary that atomic amount (substituted atomic amount) of Fe for which the aforementioned elements are substituted is within the limits which do not have bad influences on magnetic properties, amorphous forming ability, fusion conditions such as a melting point and material costs. More specifically, preferable substituted atomic amount is equal to 3 at % or less of Fe.

Additionally, the amorphous powder may not be complete amorphous. For example, the amorphous powder may include an initial crystal component formed in a process of production. The initial crystal component is one of causes which deteriorate magnetic properties of a Fe-based nanocrystalline alloy powder. In detail, owing to initial formed substance, there is a case where nanocrystals each of which has a grain diameter exceeding 100 nm are formed in the Fe-based nanocrystalline alloy powder. The nanocrystals each of which has the diameter exceeding 100 nm inhibit migration of a magnetic domain wall and deteriorate magnetic properties of the Fe-based nanocrystalline alloy powder even if they are formed in small quantity. Therefore, a ratio of the initial crystal component (initial crystallinity) is preferably less than 10%, particularly, the initial crystallinity is preferably less than 3% to achieve good magnetic properties. The initial crystallinity may be calculated by analyzing measurement results of X-ray diffraction (XDR) using the whole-powder-pattern decomposition method (WPPD method). Additionally, the initial crystallinity mentioned above is not represent crystallinity in each particle forming the powder but a volume ratio of the whole of the initial crystal component in the whole of the amorphous powder.

In the nanocrystal powder obtained by heat-treating the amorphous powder, formed crystal phase may include compound phases (Fe—B, Fe—P, Fe—B—P etc.) together with bccFe (αFe(—Si)). In order to suppress deterioration of the magnetic properties of the nanocrystal powder which caused by stress, a crystal grain diameter (average grain diameter) of a nanocrystal to be formed is desirably less than 45 nm, and a formation ration of the nanocrystals (crystallinity) is preferably equal to 30% or more. Particularly, in order to achieve better magnetic properties in a case where a powder core is produced by use of the obtained nanocrystal powder, the average grain diameter of the nanocrystals is preferably equal to 35 nm or less, and the crystallinity is preferably equal to 45% or more. Moreover, the crystal grain diameter (average grain diameter) of the compound phase is desirably less than 30 nm, and preferably equal to 20 nm or less to achieve better magnetic properties. That is, the crystallinity and the crystal grain diameter are set to the above-mentioned ranges, so that it can be effectively suppress that the magnetic properties of the nanocrystal powder itself is deteriorated by stress. Additionally, the crystallinity and the crystal grain diameter can be changed by adjusting holding temperature, holding time and temperature rising rate in the heat-treatment. Moreover, the average grain diameter of the nanocrystals and the crystallinity can be calculated by analyzing measurement results of X-ray diffraction (XDR) using the whole-powder-pattern decomposition method (WPPD method).

Next, in step S22, the malleable powder is added to the nanocrystal powder and sufficiently mixed to obtain the mixed powder. The malleable powder preferably has Vickers hardness of less than 450 Hv to show a desirable malleability when producing a powder core (pressure-molding) and to reduce stress strain on the nanocrystal powder. In addition, in order to improve the magnetic properties, the Vickers hardness of the malleable powder is preferably less than 250 Hv. Moreover, a particle diameter ratio of the malleable powder to the nanocrystal powder (an average grain diameter of the malleable powder/an average grain diameter of the nanocrystal powder) should be equal to 1 or less to achieve excellent magnetic properties, and preferably less than 0.25. Furthermore, content of the malleable powder is preferably equal to 10 wt % or more and equal to 90 wt % or less, and particularly it is more preferably equal to 20 wt %-80 wt % to achieve excellent magnetic properties. The malleable powder used in the present embodiment is one alloy metal powder selected from a carbonyl iron powder, a Fe—Ni alloy powder, a Fe—Si alloy powder, a Fe—Si—Cr alloy powder, a Fe—Cr and pure iron powder.

Additionally, two or more types of powders having different compositions and different grain size distributions may be used as the nanocrystal powder used in step S22. Moreover, as the malleable powder, two or more types of powders having different compositions and different grain size distributions may be used. Combining powders having different grain size distributions gives a hope that a packing factor is increased, and thereby improving the magnetic properties is expected. For example, it is a combination of two types of powders, a fine carbonyl iron powder and a Fe—Si—Cr powder having intermediate grain size between that of carbonyl iron powder and that of nanocrystal powder. Furthermore, for a specific object, a third powder different from the nanocrystal powder in composition and having Vickers hardness of 450 Hv or more may be mixed. The third powder may be magnetic powder. Moreover, in order to improve insulation resistance (IR) of the powder core, a ceramic powder, such as silica, titania and alumina can be used as the third powder.

Prior to step S22, surface coatings, such as resin, phosphate, silica, diamond like carbon (DLC) and low melting glass, may be applied to surfaces of the nanocrystal powder. Similarly, surface coatings, such as resin, phosphate, silica, DLC and low melting glass, may be also applied to surfaces of the malleable powder. Additionally, these surface coatings may be applied prior to not step S22 but step S21. That is, heat-treatment for nanocrystallization may be carried out after coatings are applied on surfaces of the amorphous powder.

Next, in step S23, the mixed powder and the binder having good insulation are sufficiently mixed, and mixture obtained is controlled in grain size to obtain the granulated powder. However, the present invention is not limited thereto. The malleable powder may be mixed after the nanocrystal powder and the insulative binder are mixed.

Next, in step S24, the granulated powder is pressure-molded using the mold to produce the green compact. As mentioned above, use of a powder having Vickers hardness of less than 450 Hv and a particle diameter ratio against a nanocrystal powder of 1 or less as the malleable powder can reduce stress strain on the nanocrystal powder when the pressure-molding. That is, use of such a malleable powder can suppress deterioration of magnetic properties of the nanocrystal powder, and heat-treatment at a relatively high temperature for removing strain can become unnecessary.

Finally, in step S25, the green compact is heat-treated. This heat-treatment is carried out at a temperature equal to or higher than the temperature (curing initiation temperature) required for curing the binder. This temperature is lower than the first crystallization initiation temperature Tx1. That is, in the present embodiment, the binder is cured so as not to cause or promote nanocrystallization after the pressure-molding. In this manner, the powder core is produced. Additionally, the atmosphere at the time of the heat-treatment is desirable to be an inert atmosphere to suppress the surface oxidation of the powder. However, for a specific object such as control of curing reaction of the binder, an oxidizing atmosphere such as an air may be used.

As mentioned above, in the method for manufacturing the powder core according to the present embodiment, heat-treatment is not carried out at relatively high temperature after pressure-molding. In the present embodiment, the malleable powder having Vickers hardness less than 450 Hv is added to the soft magnetic powder nanocrystalized appropriately. Accordingly, a duct core having excellent magnetic properties can be produced by only carrying out the heat-treatment for curing the binder. Moreover, in comparison with the conventional method of manufacturing the powder core, the method of manufacturing powder core according to the present embodiment has the large number of options of binders. Furthermore, the powder core according to the present embodiment has uniform nanocrystal structure inside thereof and excellent soft magnetic properties.

Figure 4:
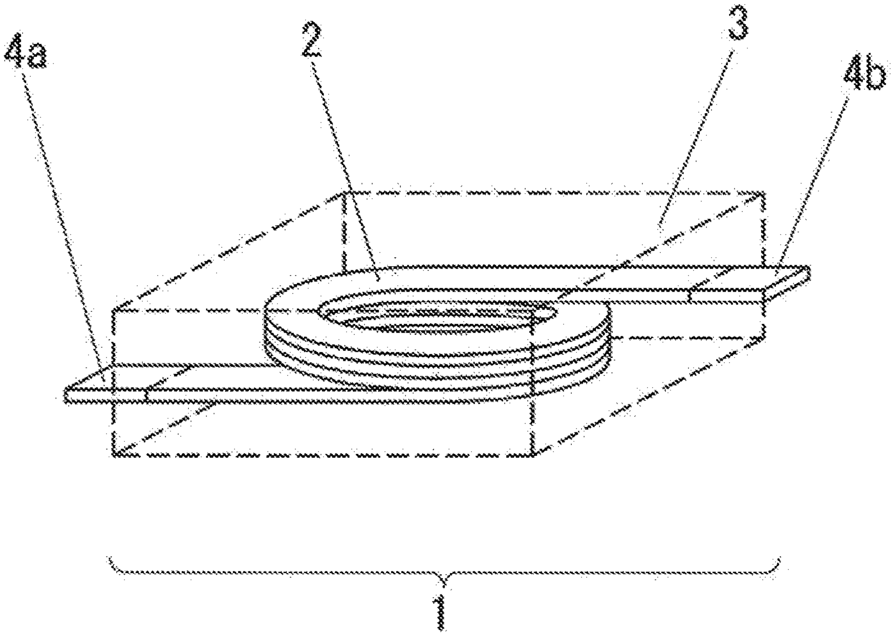
FIG. 4 is a perspective transparent view showing an inductor manufactured by use of the method for manufacturing the powder core according to the embodiment of the present invention.

The method for manufacturing the powder core according to the present embodiment can use to manufacture a powder core in which a coil is built as shown in FIG. 4, or an inductor 1. The inductor 1 of FIG. 4 is an inductor having a core integrated type structure in which a coil 2 is built in a powder core 3. This inductor 1 can be produced by arranging the coil 2 in the mold when producing the green compact in step S24 mentioned above. The coil 2 shown in FIG. 4 is an edgewise coil formed by winding a flat wire, a cross section of which is perpendicular to a length direction and has a rectangular shape, so that a long side of the cross section is perpendicular to a central axis of the coil. The coil 2 is built in the powder core 3 so that both terminal portions 4*a* and 4*b* thereof protrude to the outside of the powder core 3. However, the present invention is not limited thereto. A coil having another shape may be used.

EXAMPLES

Examples 1 to 5 and Comparative Examples 1 to 3

Examples 1 to 5 and Comparative Examples 2 and 3 are powder cores each of which was produced by mixing a nanocrystal powder with a malleable powder (an additive powder) having a different Vickers hardness. Comparative Example 1 is a powder core produced from only a nanocrystal powder.

Examples 1 to 5 and Comparative Examples 2 and 3 were produced by the method for manufacturing a powder core shown in FIG. 2. Comparative Example 1 was produced by the method for manufacturing a powder core shown in FIG. 2 except for step S22. As an amorphous powder (a mother powder), a $Fe_{80.9}Si_4B_7P_{6.5}Cr_1Cu_{0.6}$ powder made by the water atomize method and having an average particle diameter of 40 μm was used.

In step S21, the mother powder was heated by use of an infrared heating device in an inert atmosphere. The mother powder was heated up to 450° C. at a temperature rising rate of 30° C. per minute, held for 20 minutes, and then cooled by air. As analyzed the powder (nanocrystal powder) after heat-treatment by XRD, a crystallinity thereof was 51% and a crystal grain diameter was 35 nm.

In step S22, an additive powder was mixed with the nanocrystal powder at a ratio of 25 wt %. Furthermore, in step S23, a binder was added to the mixed powder consists of the nanocrystal powder and the additive powder at a weight ratio of 2%, and they were stirred and mixed. Here, as the binder, a phenol resin was used. Subsequently, using a mesh having an opening of 500 μm, grain size control of the mixed powder mixed with the binder was carried out to obtain a granulated powder.

In step S24, the granulated powder of 4.5 g was weighted, and the weighted granulated powder was put into a mold. The granulated powder in the mold was molded by a hydraulic auto press machine at a pressure of 980 MPa to produce a green compact having a cylindric shape with an external diameter of 20 mm and an internal diameter of 13 mm.

In step S25, the green compact was introduced in a thermostat to place it in an inert atmosphere, and the temperature in the thermostat was set to 150° C. and held for 2 hours. Thus, the binder included in the green compact was cured.

As magnetic property evaluation of the powder cores produced, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT. Table 1 shows evaluation results of Examples 1 to 5 and Comparative Examples 1 to 3.

TABLE 1

| | Additive Powder | | | Magnetic Property | |
|---|---|---|---|---|---|
| | Type | Vickers Hardness (Hv) | Addition Amount (wt %) | μ (—) | $Pcv(kW/m^3)$ |
| Comparative Example 1 | none | — | 0 | 23 | 3120 |
| Example 1 | Fe—Ni | 100 | 25 | 36 | 1998 |
| Example 2 | Carbonyl Iron Powder | 110 | 25 | 35 | 1796 |
| Example 3 | Fe—3Si | 240 | 25 | 35 | 1910 |
| Example 4 | Fe—Si—Cr | 350 | 25 | 34 | 2060 |
| Example 5 | Fe—6.5Si | 420 | 25 | 31 | 1932 |
| Comparative Example 2 | Sendust | 500 | 25 | 29 | 2510 |
| Comparative Example 3 | Iron Amorphous | 800 | 25 | 28 | 2630 |

From Table 1, it is understood that, in comparison with the powder core of Comparative Example 1 which was produced from only the nanocrystal powder, each of the powder cores mixed with the additive powder achieved an increased initial permeability μ, a decreased core loss Pcv and improved magnetic properties. In each case of the present invention in which the powder having a Vickers hardness of 450 Hv or less was added, particularly, the initial permeability μ became equal to 25 or more, and the core loss Pcv became equal to 2500 $mW/km^3$ or less, and excellent magnetic properties were achieved. In a case where the powder having a Vickers hardness less than 250 was added, particularly, the initial permeability μ was equal to 35 and more, the core loss Pcv was equal to 2000 $mW/km^3$ or less, and more excellent magnetic properties were achieved.

Examples 6 to 15, Comparative Examples 1 and 4

Examples 6 to 15 are powder cores each of which was produced by use of carbonyl iron as an additive powder and by changing addition amount thereof. Comparative Example 1 is a powder core (same as above) produced from only a nanocrystal powder. Comparative Example 4 is a duct core produced from only a carbonyl iron powder.

Production of Examples 6 to 15 was carried out in the same manner as Examples 1 to 5 except that the additive powder was a carbonyl iron powder and addition amount thereof was changed. Production of Comparative Examples 1 and 4 was also carried out in the same manner as Examples 1 to 5 except that raw materials thereof were different. Moreover, magnetic property evaluation of Examples 6 to 15 and Comparative Examples 1 and 4 was carried out in the same manner as the evaluation for Examples 1 to 5. Table 2 shows evaluation results of Examples 6 to 15 and Comparative Examples 1 and 4.

TABLE 2

| | Additive Powder | | | |
|---|---|---|---|---|
| | | Addition Amount | Magnetic Property | |
| | Type | (wt %) | μ (—) | Pcv(kW/m³) |
| Comparative Example 1 | none | 0 | 23 | 3120 |
| Example 6 | Carbonyl Iron Powder | 10 | 28 | 2480 |
| Example 7 | Carbonyl Iron Powder | 20 | 32 | 2085 |
| Example 8 | Carbonyl Iron Powder | 25 | 35 | 1850 |
| Example 9 | Carbonyl Iron Powder | 30 | 37 | 1698 |
| Example 10 | Carbonyl Iron Powder | 40 | 39 | 1554 |
| Example 11 | Carbonyl Iron Powder | 50 | 41 | 1476 |
| Example 12 | Carbonyl Iron Powder | 60 | 40 | 1448 |
| Example 13 | Carbonyl Iron Powder | 70 | 38 | 1486 |
| Example 14 | Carbonyl Iron Powder | 80 | 33 | 1602 |
| Example 15 | Carbonyl Iron Powder | 90 | 26 | 1756 |
| Comparative Example 4 | Carbonyl Iron Powder | 100 | 18 | 2019 |

From Table 2, it is understood that, by adding the carbonyl iron powder to the nanocrystal powder, the initial permeability μ was increased and the core loss Pcv was reduced in comparison with the powder cores shown as Comparative Examples 1 and 4 each of which was produced from the single powder. Specifically, when added ratio of the carbonyl iron powder was in a range of 10 to 90 wt %, the initial permeability μ became equal to 25 or more, the core loss Pcv became equal to 2500 kW/m$^3$ or less, and then excellent magnetic properties were achieved. In a case where the added ratio of the carbonyl iron powder was equal to 20 wt % or more, particularly, the core loss Pcv was equal to 2000 kW/m$^3$ or less. In addition, when the added ratio of the carbonyl iron powder was less than 80 wt %, the initial permeability μ was equal to 35 or more, and more excellent magnetic properties were achieved.

Examples 16 to 20, Comparative Examples 5 and 6

Examples 16 to 20 and Comparative Examples 5 and 6 are powder cores produced by changing a particle diameter ratio of the nanocrystal powder to the additive powder. Examples 16 to 20 and Comparative Examples 5 and 6 were produced by the method for manufacturing a powder core shown in FIG. 2. As the amorphous powder (mother powder), a $Fe_{80.9}Si_4B_7P_{6.5}Cr_1Cu_{0.6}$ powder produced by the water atomize method and having an average particle diameter of 60 μm was used. The powder heat-treatment process P1 was carried out as the same manner as Examples 1 to 5, and then shifter classification was carried out to control a grain diameter of the nanocrystal powder. Types, grain sizes and addition amounts of added powders used for Examples 16 to 20 and Comparative Examples 5 and 6 were as shown in Table 3. Other conditions in the core manufacturing process P2 were the same as Examples 1 to 5. Moreover, magnetic property evaluation of Examples 16 to 20 and Comparative Examples 5 and 6 were carried out in the same manner as cases of Examples 1 to 5. Table 3 shows evaluation results of Examples 16 to 20 and Comparative Examples 5 and 6.

TABLE 3

| | Mother Powder | Additive Powder | | | Particle Diameter Ratio | | |
|---|---|---|---|---|---|---|---|
| | Particle Diameter (μm) | Type | Particle Diameter (μm) | Addition Amount (wt %) | Additive Powder/Mother Powder | Magnetic Property μ (—) | Pcv (kW/m³) |
| Comparative Example 5 | 60 | none | 0 | 0 | 0 | 24 | 3521 |
| Example 16 | 60 | Carbonyl Iron Powder | 4 | 45 | 0.07 | 44 | 1823 |
| Example 17 | 45 | Fe—Si—Cr | 8 | 35 | 0.18 | 36 | 1960 |
| Example 18 | 40 | Fe—Ni | 10 | 25 | 0.25 | 34 | 2176 |
| Example 19 | 50 | Fe—3Si | 25 | 65 | 0.5 | 32 | 2100 |
| Example 20 | 40 | Fe—Ni | 40 | 40 | 1 | 33 | 2493 |
| Comparative Example 6 | 40 | Fe—Ni | 90 | 25 | 2.25 | 28 | 3989 |

From Table 3, in a case where the particle diameter ratio of the additive powder to the nanocrystal powder (the additive powder/the nanocrystal powder) was equal to 1 or less, it can be understood that the initial permeability μ became equal to 25 or more, the core loss Pcv became equal to 2500 kW/m$^3$ or less, and excellent magnetic properties were achieved. When a particle diameter ratio was less than 0.25 particularly, the initial permeability μ was equal to 35 or more and the core loss Pcv was equal to 2000 kW/m$^3$ or less, and more excellent magnetic properties were achieved.

Examples 21 to 26, Comparative Example 7

Examples 21 to 26 and Comparative Example 7 are powder cores produced by changing crystallinities of the nanocrystal powder and average crystal grain diameters. Examples 21 to 26 and Comparative example 7 were produced by the method for manufacturing a powder core shown in FIG. 2. As the mother powder, a Fe82.9Si4B6P6.5Cu0.6 powder produced by the water atomize method and having an average particle diameter of 50 μm was used. In the powder heat-treatment process P1, the mother powder was heated up to 400° C.-450° C. at a temperature rising rate of 10° C.-50° C. per minute by use of an infrared heating device in an inert atmosphere, held for 20 minutes, and cooled by air to obtain a nanocrystal powder having different crystallinities and different average crystal grain diameters. The crystallinity and the average grain diameter of the nanocrystal powder were calculated from measurement results of XRD. The core manufacturing process P2 was carried out in the same manner as Examples 1 to 5, where the additive powder was a carbonyl iron powder, and addition amount thereof was 25 wt %. Regarding each of Examples 21 to 26 and Comparative Example 7, magnetic property evaluation was carried out as with Examples 1 to 5. Table 4 shows evaluation results of Examples 21 to 26 and Comparative Example 7.

and particularly excellent magnetic properties were obtained. Thus, it was efficiently suppressed that magnetic properties of the nanocrystal powder itself were decreased by stress.

Examples 27 and 28, Comparative Example 8, Reference Examples 1 and 2

Figure 3:
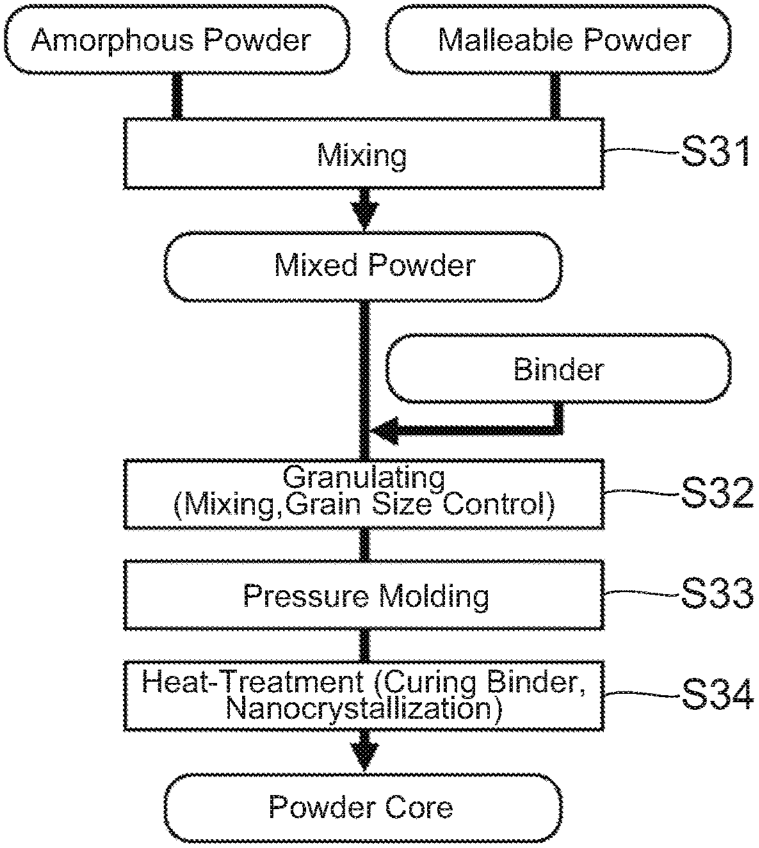
FIG. 3 is a flowchart for describing a method for manufacturing a conventional powder core.

Reference Example 1 and Comparative Example 8 are powder cores produced by a conventional method for manufacturing a powder core shown in FIG. 3. Reference Example 2 and Examples 27 and 28 are powder cores produced by the method for manufacturing a powder core of the present invention shown in FIG. 2.

In Reference Example 1 and Comparative Example 8, as the mother powder, a $Fe_{80.9}Si_4B_7P_{6.5}Cr_1Cu_{0.6}$ powder produced by the water atomize method and having an average particle diameter of 40 μm was used. A carbonyl iron powder was used as an additive powder, and addition amount thereof was 20 wt %. As the binder, a solid silicone resin was used. The binder was weighed to 2% in weight ratio to the mixed powder of the nanocrystal powder and the carbonyl iron powder and used after being stirred and dissolved in IPA (isopropyl alcohol). Grain size control after mixing the binder was carried out by passing the mixture through a mesh of 500 μm. The granulated powder of a predetermined weight was put in a mold and molded by a hydraulic auto press machine at a pressure of 980 MPa, and thereby a green compact having a cylindrical shape with an external diameter of 13 mm and an internal diameter of 8 mm and a different height was produced. Heat-treatment for the green compact was carried out by use of an infrared heating device to heat the green compact up to 450° C. at a temperature rising rate of 40° C. per minute in an inert gas atmosphere, and cool it by air after holding it for 20 minutes.

In Reference Example 2 and Examples 27 and 28, as the mother powder, a $Fe_{80.9}Si_4B_7P_{6.5}Cr_1Cu_{0.6}$ powder produced by the water atomize method and having an average particle diameter of 40 μm was used. The mother powder was heated up to 450° C. at a temperature rising rate of 40° C. per minute by use of an infrared heating device, held for 20 minutes, and then cooled by air to obtain a nanocrystal powder. As the binder, a solid silicone resin was used. The binder was weighed to 2% in weight ratio to the mixed powder of the nanocrystal powder and the carbonyl iron powder and used after being stirred and dissolved in IPA

TABLE 4

| | Mother Powder | | | Additive Powder | | Magnetic Property | |
|---|---|---|---|---|---|---|---|
| | Crystallinity | Crystal grain diameter (nm) | Compound | Type | Addition Amount (wt %) | μ (—) | Pcv (kW/m$^3$) |
| Comparative Example 7 | 25 | 42 | absent | Carbonyl Iron Powder | 25 | 33 | 2647 |
| Example 21 | 30 | 44 | absent | Carbonyl Iron Powder | 25 | 34 | 2495 |
| Example 22 | 31 | 40 | absent | Carbonyl Iron Powder | 25 | 35 | 2480 |
| Example 23 | 41 | 37 | absent | Carbonyl Iron Powder | 25 | 37 | 2363 |
| Example 24 | 45 | 35 | absent | Carbonyl Iron Powder | 25 | 39 | 1930 |
| Example 25 | 56 | 27 | absent | Carbonyl Iron Powder | 25 | 45 | 1500 |
| Example 26 | 58 | 34 | present | Carbonyl Iron Powder | 25 | 39 | 2216 |

From Table 4, when the crystallinity was equal to 30% or more and the crystal grain diameter was less than 45 nm, it can be understood that the initial permeability μ became equal to 25 or more, the core loss Pcv became equal to 2500 kW/m$^3$ or less, and excellent magnetic properties were achieved. Moreover, when the crystallinity was equal to 45% or more and the crystal grain diameter was less than or equal to 35 nm, the initial permeability μ was equal to 35 or more, the core loss Pcv was equal to 2000 kW/m$^3$ or less, (isopropyl alcohol). Grain size control in step S23 was carried out by passing the mixture through a mesh of 500 μm. The granulated powder of a predetermined weight was put in a mold and molded by a hydraulic auto press machine at a pressure of 980 MPa, and thereby a green compact having a cylindrical shape with an external diameter of 13 mm and an internal diameter of 8 mm and a different height was produced. Curing process of the binder in step S24 was carried out by introducing the green compact in a thermostat to put it in an inert atmosphere, setting a temperature in the thermostat to 150° C. and holding for 2 hours.

Magnetic property evaluation of Examples 27 and 28, Reference examples 1 and 2 and Comparative Example 8 was carried out in the same manner as Examples 1 to 5. The crystal grain diameter inside of the powder core was found from structure observation of a powder core cross section using an electron microscope. Table 5 shows evaluation results of Examples 27 and 28, Reference Examples 1 and 2 and Comparative Example 8.

TABLE 5

| | Core Shape | | | | | | | | |
|---|---|---|---|---|---|---|---|---|---|
| | External Diameter-Internal Diameter (mm) | Height (mm) | Cross Section (mm) | Crystallization Heat Treatment | Crystal Grain Diameter (nm) Surface | Center | Grain Diameter Ratio Center/Surface | Magnetic Property μ (—) | Pcv ($kW/m^3$) |
| Reference Example 1 | 13-8 | 3 | 7.5 | After Molding | 32 | 31 | 1 | 34 | 1620 |
| Comparative Example 8 | 13-8 | 4 | 10 | After Molding | 33 | 45 | 1.4 | 32 | 2563 |
| Reference Example 2 | 13-8 | 3 | 7.5 | Before Molding | 34 | 34 | 1 | 34 | 1785 |
| Example 27 | 13-8 | 4 | 10 | Before Molding | 34 | 34 | 1 | 34 | 1796 |
| Example 28 | 13-8 | 6 | 15 | Before Molding | 34 | 34 | 1 | 33 | 1782 |

From Table 5, it is understood that, when the height of the powder core was low and the cross sectional area was small as in Reference Example 1 or Reference Example 2, there was little difference between a crystal grain diameter in the vicinity of a surface and a crystal grain diameter at a cross section center in each of the conventional manufacturing method and the present invention, and excellent magnetic properties were achieved. However, when a cross sectional area of the powder core became 10 $mm^2$ or more as in Comparative Example 8, the crystal grain diameter in the vicinity of the center of the cross sectional surface became larger than the crystal grain diameter of the vicinity of the surface of the powder core. As a result, in Comparative Example 8, the initial permeability μ was reduced and the core loss Pcv was increased in comparison with Example 27. On the other hand, in the present invention, there was no difference between the crystal grain diameter in the vicinity of the surface and that in the vicinity of the cross-sectional center even when the cross-sectional area became larger as in Example 28. Then, Example 28 achieved excellent magnetic properties owing to uniform fine structure.

Examples 29 and 30, Comparative Examples 9 and 10

Examples 29 and 30 are core integrated type inductors produced by the method for manufacturing a powder core shown in FIG. 2. Comparative Examples 9 and 10 are core integrated type inductors produced by the method for manufacturing a powder core shown in FIG. 3.

Comparative Examples 9 and 10 were produced as the follows. As the mother powder, a $Fe_{80.9}Si_4B_7P_{6.5}Cr_1Cu_{0.6}$ powder produced by the water atomize method and having an average particle diameter of 20 μm was used. Moreover, a carbonyl iron powder was used as an additive powder, and addition amount thereof was 50 wt %. As the binder, a silicone resin (Comparative Example 9) or a phenol resin (Comparative Example) was used. The binder was added to the mixed powder consists of the mother powder and the additive powder at a weight ratio of 2% to be stirred and mixed, and grain size control was carried out. The grain size control after mixing the binder was carried out by passing the mixture through a mesh of 500 μm. As a coil, an air-core coil in which a flat wire (sizes of a cross section are 0.75 mm in height by 2.0 mm in wide) of a copper wire covered with an insulator was wound in an edgewise winding having 2.5 layers or 2.5 turns and an internal diameter of 4.0 mm was used. The air-core coil was set in a mold, the granulated powder was filled into the mold to be a state that the air-core coil was embedded, and molding was carried out at a pressure of 490 MPa by use of a hydraulic auto press machine. A green compact was taken out from the mold, heated up to 450° C. at a temperature rising rate of 40° C. per minute in an inert gas atmosphere by use of an infrared heating device, held for 20 minutes, and then cooled by air. In this manner, as Comparative Examples 9 and 10, core integrated type inductors having an outer shape of 10.0 mm by 10.0 mm by 4.0 mm were produced.

Examples 29 and 30 were produced as the follows.

As the mother powder, a $Fe_{80.9}Si_4B_7P_{6.5}Cr_1Cu_{0.6}$ powder produced by the water atomize method and having an average particle diameter of 20 μm was used. The mother powder was heated up to 450° C. at a temperature rising rate of 40° C. per minute in an inert atmosphere by use of an infrared heating device, held for 20 minutes, and then cooled by air to obtain a nanocrystal powder. A crystallinity of the nanocrystal powder analyzed by XRD was equal to 53%, and a crystal grain diameter was equal to 33 nm. A carbonyl iron powder was mixed with the nanocrystal powder so that an addition amount thereof was equal to 50 wt %. A silicone resin (Example 29) or a phenol resin (Example 30) which was a binder was added to the mixed powder at a weight ratio of 2% to be stirred and mixed, and grain size control was carried out to obtain a granulated powder. The grain size control after mixing the binder was carried out by passing the mixture through a mesh of 500 μm. As a coil, an air-core coil in which a flat wire (sizes of a cross section are 0.75 mm in height by 2.0 mm in wide) of a copper wire covered with an insulator was wound in an edgewise winding having 2.5 layers or 2.5 turns and an internal diameter of 4.0 mm was used. The air-core coil was set in a mold, the granulated powder was filled into the mold to be a state that the air-core coil was embedded, and molding was carried out at a pressure of 490 MPa by use of a hydraulic auto press machine. After the green compact was taken out from the mold, the green compact was introduced in a thermostat to place it in an inert atmosphere. Then the temperature in the thermostat was set to 150° C. and held for 2 hours. Thus, the binder of the green compact was cured, and a core integrated type inductor having an outer shape of 10.0 mm by 10.0 mm by 4.0 mm was produced.

Evaluation of Comparative Examples 9 and 10 and Examples 29 and 30 was carried out. As the evaluation, visual observation of appearance, and measurement of insulation resistance between the core and the coil when given an input voltage of 50V were carried out. Table 6 shows evaluation results of Comparative Examples 9 and 10 and Examples 29 and 30.

TABLE 6

| | Nanocrystallization Heat Treatment | Appearance Coil/Core | IR(50 V) |
|---|---|---|---|
| Example 29 | Before Molding | good/good | ≥5000 MΩ |
| Comparative Example 9 | After Molding | bad/good | 1 MΩ |
| Example 30 | Before Molding | good /good | ≥5000 MΩ |
| Comparative Example 10 | After Molding | bad/bad | <0.05 MΩ |

In each of the appearances of Comparative Examples 9 and 10, coil parts were changed in color. Moreover, in Comparative Example 10, it was recognized that a core part was changed to black in color. On the other hand, in Examples 29 and 30, it was not recognized that the appearances of them were changed in color or the like. Moreover, insulation resistances of Examples 29 and 30 were over an upper measurement limit of 5000 MΩ. On the other hand, that of Comparative Example 9 was equal to 1 MΩ, and that of Comparative Example 10 was less than a lower measurement limit of 0.05 MO. The difference between Comparative Example 9 and Comparative Example 10 was due to the binders. The insulation resistance of Comparative Example 9 using the silicone resin with high heat resistance was higher than that of Comparative Example 10 using the phenol resin. Even so, the insulation film of the coil part was deteriorated in Comparative Example 9, so that the insulation resistance was reduced in comparison with Examples 29 and 30. The present invention has many options for binders owing to relatively low temperature of the heat-treatment after the pressure molding. Therefore, the present invention can obtain a core integrated type inductor which has no deterioration of components thereof.

Examples 31 to 36, Comparative Examples 11 to 16

Examples 31 to 36 are powder cores produced by combining nanocrystal powders and additive powders in various ways. Comparative Examples 11 to 16 are powder cores produced from only different nanocrystal powder without mixing with an additive powder. Examples 31 to 36 were produced by the method for manufacturing a powder core shown in FIG. 2. Comparative examples 11 to 16 were produced in the same manner as Examples 31 to 36 except for using no additive powder (Step S22). Table 7 shows various production conditions of Examples 31 to 36 and evaluation results of magnetic properties of them.

TABLE 7

| | Mother Powder Composition | Heat Treatment Condition | Crystallinity (%) | Crystal Grain Diameter (nm) | Additive Powder Type | Additive Powder Addition Amount (wt %) | Magnetic Property μ (—) | Magnetic Property Pcv (kW/m$^3$) |
|---|---|---|---|---|---|---|---|---|
| Example 31 | $Fe_{72.5}Si_{13.5}B_9Nb_3Cu_2$ | 550° C. × 30 min, 1.7° C./min | 67 | 12 | Fe—Ni | 15 | 45 | 1800 |
| Comparative Example 11 | $Fe_{72.5}Si_{13.5}B_9Nb_3Cu_2$ | 550° C. × 30 min, 1.7° C./min | 67 | 12 | — | 0 | 25 | 2891 |
| Example 32 | $Fe_{80.4}Si_3B_6P_9Cr_{1.4}Cu_{0.2}$ | 425° C. × 30 min, 10° C./min | 37 | 30 | Fe—3Si | 35 | 43 | 2010 |
| Comparative Example 12 | $Fe_{80.4}Si_3B_6P_9Cr_{1.4}Cu_{0.2}$ | 425° C. × 30 min, 10° C./min | 37 | 30 | — | 0 | 26 | 3779 |
| Example 33 | $Fe_{81.4}Si_4B_4P_9Cr_{1.1}Cu_{0.5}$ | 400° C. × 30 min, 30° C./min | 45 | 25 | Carbonyl Iron Powder | 50 | 48 | 1840 |
| Comparative Example 13 | $Fe_{81.4}Si_4B_4P_9Cr_{1.1}Cu_{0.5}$ | 400° C. × 30 min, 30° C./min | 45 | 25 | — | 0 | 26 | 3251 |
| Example 34 | $Fe_{84.5}Si_1B_2P_{11}Cr_{0.7}Cu_{0.8}$ | 380° C. × 30 min, 5° C./min | 55 | 20 | Fe—Si—Cr | 65 | 30 | 2050 |
| Comparative Example 14 | $Fe_{84.5}Si_1B_2P_{11}Cr_{0.7}Cu_{0.8}$ | 380° C. × 30 min, 5° C./min | 55 | 20 | — | 0 | 24 | 2973 |
| Example 35 | $Fe_{79.6}Si_4B_{14}Nb_1Cu_{1.4}$ | 475° C. × 30 min, 3° C./min | 32 | 39 | Fe—6.5Si | 75 | 28 | 2230 |
| Comparative Example 15 | $Fe_{79.6}Si_4B_{14}Nb_1Cu_{1.4}$ | 475° C. × 30 min, 3° C./min | 32 | 39 | — | 0 | 23 | 3529 |
| Example 36 | $Fe_{82.3}B_7P_9Cr_1Cu_{0.7}$ | 425° C. × 30 min, 20° C./min | 50 | 23 | Fe—Cr | 40 | 38 | 1672 |
| Comparative Example 16 | $Fe_{82.3}B_7P_9Cr_1Cu_{0.7}$ | 425° C. × 30 min, 20° C./min | 50 | 23 | — | 0 | 23 | 3002 |

In each of Reference Examples 31 to 36 and Comparative Examples 11 to 16, as the mother powder, a powder produced by the water atomize method and having an average particle diameter of 50 μm was used. The mother powder was heated in an inert atmosphere by use of an infrared heating device, and then cooled by air to obtain a nanocrystal powder. Compositions of the mother powders and temperature rising rates, holding temperatures, holding times in heat-treatment processes for the mother powders were as described in Table 7. Crystallinities and crystal grain sizes of the nanocrystal powders analyzed by XRD were also as described in Table 7.

In each of Examples 31 to 36, the nanocrystal powder and the additive powder (malleable powder) were mixed at a ratio described in Table 7 to obtain a mixed powder. Among the additive powders, Fr—Cr had Vickers hardness of 200 Hv. Fe—Ni, Fe-3Si, a carbonyl iron powder, Fe—Si—Cr and Fe-6.5Si were the same as those of Examples 1 to 5 described in Table 1. In each of Comparative Examples 11 to 16, the nanocrystal powder was directly used without adding an additive powder. The binder was added to the mixed powder (Examples 31 to 36) or the nanocrystal powder (Comparative Examples 11 to 16) at a weight ratio of 3%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 980 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Examples 31 to 36 and Comparative Examples 11 to 16, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 7, also in each of various combinations of compositions of the nanocrystal powders and types and amounts of the additive powders, it can be understood that the powder core having excellent magnetic properties with a high initial permeability μ and a low core loss Pcv was obtained. That is, in the present invention, by mixing the nanocrystal powder having a predetermined nanocrystallization state (crystallinity, crystal grain diameter) and a predetermined additive powder (Vickers hardness, amount), the excellent magnetic properties can be achieved.

Examples 37 to 40, Comparative Examples 17 and 18

Examples 37 to 40 are powder cores produced after coatings are formed on surfaces of the nanocrystal powders (and the additive powders). Comparative Examples 17 and 18 are powder cores produced from only nanocrystal powder of which surfaces are applied with surface coatings without mixing with an additive powder. The surface coating for the nanocrystal powder and the additive powder was carried out by a mechano-fusion method to stick glass frit on the powders. The amount of the glass frit added was 1.0 wt % to the weight of the powders. Examples 37 to 40 were produced by the method for manufacturing a powder core shown in FIG. 2. Comparative Examples 17 and 18 were produced in the same manner as Examples 37 to 40 except for using no additive powder (step S22). Table 8 shows various production conditions of Examples 37 to 40 and Comparative Examples 17 and 18 and evaluation results of magnetic properties of them.

TABLE 8

| | Mother Powder Composition | Heat Treatment Condition | Crystallinity (%) | Crystal Grain Diameter (nm) | Surface Coating | Additive Powder Type | Additive Powder Addition Amount (wt %) | Additive Powder Surface Coating | Magnetic Property μ (—) | Magnetic Property Pcv (kW/m³) |
|---|---|---|---|---|---|---|---|---|---|---|
| Example 37 | $Fe_{81.4}Si_2B_6P_9Cr_1Cu_{0.6}$ | 420° C. × 30 min, 10° C./min | 45 | 28 | with | Fe—Si—Cr | 30 | without | 33 | 2400 |
| Example 38 | | | | | | Fe—Si—Cr | 30 | with | 31 | 2200 |
| Comparative Example 17 | | | | | | — | 0 | — | 22 | 3400 |
| Example 39 | $Fe_{81.2}Si_3B_6P_9Cr_{0.2}Cu_{0.6}$ | 420° C. × 30 min, 10° C./min | 48 | 26 | with | Fe—Cr | 55 | without | 39 | 1600 |
| Example 40 | | | | | | Fe—Cr | 55 | with | 36 | 1500 |
| Comparative Example 18 | | | | | | — | 0 | — | 23 | 3200 |

In each of Examples 37 to 40 and Comparative Examples 17 and 18, as the mother powder, a powder produced by the water atomize method and having an average particle diameter of 65 μm was used. The mother powder was heated in an inert atmosphere by use of an infrared heating device, and then cooled by air to obtain a nanocrystal powder. Compositions of the mother powders and temperature rising rates, holding temperatures and holding times in heat-treatment processes for the mother powders were as described in Table 8. Crystallinities and crystal grain sizes of the nanocrystal powder analyzed by XRD were also as described in Table 8.

In each of Examples 37 to 40, the nanocrystal powder and the additive powder (malleable powder) were mixed at a ratio described in Table 8 to obtain a mixed powder. Among the additive powders, Fr—Cr was the same as that of Example 36 described in Table 7. Fe—Si—Cr was the same as that of Example 4 described in Table 1. In each of Comparative Examples 17 and 18, the nanocrystal powder was directly used without adding an additive powder. The binder was added to the mixed powder (Examples 37 to 40) or the nanocrystal powder (Comparative Examples 17 and 18) at a weight ratio of 1.5%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 780 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Examples 37 to 40 and Comparative Examples 17 and 18, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 8, also in a case where the coatings were applied to surfaces of the nanocrystal powder (and the additive powder), it can be understood that, by adding the malleable powder, the powder core having excellent magnetic properties with a high initial permeability μ and a low core loss Pcv was obtained. That is, in the present invention, by mixing the nanocrystal powder having a predetermined nanocrystallization state (crystallinity, crystal grain diameter) and a predetermined additive powder (Vickers hardness, amount), the excellent magnetic properties can be achieved even when the coatings are applied to the surfaces of the powder.

Examples 41 to 43, Comparative Examples 19 and 20

Examples 41 to 43 and Comparative Example 20 are powder cores produced by changing crystal grain diameters of compounds included in the nanocrystal powders. Comparative Example 19 is a powder core produced from only a nanocrystal powder without mixing with an additive powder. Example 41 to 43 and Comparative example 20 were produced by the method for manufacturing a powder core shown in FIG. 2. Comparative Example 19 was produced in the same manner as Examples 41 to 43 except for using no additive powder (step S22). Table 9 shows various production conditions of Examples 41 to 43 and Comparative Examples 19 and 20 and evaluation results of magnetic properties of them.

TABLE 9

| | Mother Powder Composition | Heat Treatment Condition | Crystallinity after Heat Treatment (%) | Crystal Grain Diameter (nm) | Compound Grain Diameter (nm) | Additive Powder: Type | Additive Powder: Addition Amount (wt %) | Magnetic Property: μ (—) | Magnetic Property: Pcv (kW/m$^3$) |
|---|---|---|---|---|---|---|---|---|---|
| Example 41 | $Fe_{80.4}Si_3B_6P_9Cr_{1.0}Cu_{0.6}$ | 420° C. × 30 min, 5° C./min | 38 | 25 | — | Fe—Cr | 30 | 39 | 1672 |
| Comparative Example 19 | | | | | | — | 0 | 24 | 3080 |
| Example 42 | | 430° C. × 30 min, 30° C./min | 45 | 28 | 20 | Fe—Cr | 30 | 38 | 1770 |
| Example 43 | | 430° C. × 30 min, 30° C./min | 47 | 24 | 28 | Fe—Cr | 30 | 35 | 2430 |
| Comparative Example 20 | | 450° C. × 30 min, 50° C./min | 54 | 25 | 32 | Fe—Cr | 30 | 29 | 2820 |

In each of Examples 41 to 43 and Comparative Examples 19 and 20, as the mother powder, a $Fe_{80.4}Si_3B_6P_9Cr_{1.0}Cu_{0.6}$ powder produced by the water atomize method and having an average particle diameter of 50 μm was used. The mother powder was heated in an inert atmosphere by use of an infrared heating device, and then cooled by air to obtain a nanocrystal powder. Temperature rising rates, holding temperatures and holding times in heat-treatment processes for the mother powders were as described in Table 9. Crystallinities and crystal grain sizes of the nanocrystal powders analyzed by XRD were also as described in Table 9.

In each of Examples 41 to 43 and Comparative Example 20, the nanocrystal powder and the additive powder (malleable powder) were mixed at a ratio described in Table 9 to obtain a mixed powder. Fr—Cr of the additive powder was the same as that of Example 36 described in Table 7. In Comparative Example 19, the nanocrystal powder was directly used without adding an additive powder. The binder was added to the mixed powder (Examples 41 to 43 and Comparative Example 20) or the nanocrystal powder (Comparative Example 19) at a weight ratio of 2.0%, and then they were stirred and mixed. As the binder, a phenol resin was used. The grain size control after mixing the binder was carried out by passing the mixture through a mesh having an opening of 500 μm. The granulated powder of 4.5 g was put in a mold and molded by a hydraulic auto press machine at a pressure of 780 MPa, and thereby a green compact having a cylindrical shape with an external diameter of 20 mm and an internal diameter of 13 mm was produced. The green compact obtained was introduced in a thermostat to place it in an inert atmosphere, and the temperature in the thermostat was set to 160° C. and held for 4 hours.

In order to evaluate magnetic properties of Examples 41 to 43 and Comparative Examples 19 and 20, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 9, in a case where the crystal grain diameter of the compound included in the nanocrystal powder was less than 30 nm, it can be understood that, by adding the malleable powder, the powder core having excellent magnetic properties with a high initial permeability μ and a low core loss Pcv was obtained. Moreover, in a case where the crystal grain diameter of the compound was less than or equal to 20 nm, the initial permeability μ was equal to 35 or more, the core loss Pcv was less than 2000 $kW/m^3$, and particularly excellent magnetic properties were obtained. Thus, it was efficiently suppressed that magnetic properties of the nanocrystal powder itself were decreased by stress. On the other hand, in a case where the crystal grain diameter of the compound included in the nanocrystal powder was equal to 30 nm or more, the core loss Pcv was equal to 2500 $kW/m^3$ or more even when the malleable powder was added. Thus, it was not efficiently suppressed that magnetic properties of the nanocrystal powder itself are decreased by stress.

Examples 44 to 48, Comparative Examples 21 to 25

Examples 44 to 48 were produced by the method for manufacturing a powder core shown in FIG. 2. Comparative Examples 21 to 25 were produced in the same manner as Examples 44 to 48 except for using no additive powder (step S22). Table 10 shows various production conditions of Examples 44 to 48 and Comparative Examples 21 to 25 and evaluation results of magnetic properties of them.

an inert atmosphere by use of an infrared heating device, and then cooled by air to obtain a nanocrystal powder. Compositions of the mother powders and temperature rising rates, holding temperatures and holding times in heat-treatment processes for the mother powders were as described in Table 10. Crystallinities and crystal grain sizes of the nanocrystal powders analyzed by XRD were also as described in Table 10.

In each of Examples 44 to 48, the nanocrystal powder and the additive powder (malleable powder) were mixed at a ratio described in Table 10 to obtain a mixed powder. Among the additive powders, a pure iron powder had Vickers hardness of 85 Hv. Fe—Cr was the same as that of Example 36 described in Table 7. Fe—Si—Cr and a carbonyl iron powder were the same as those of Example 4 and Example 2 described in Table 1, respectively. In each of Comparative Examples 21 to 25, the nanocrystal powder was directly used without adding an additive powder. The binder was added to the mixed powder (Examples 44 to 48) or the nanocrystal powder (Comparative Examples 21 to 25) at a weight ratio of 2.5%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 980 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Examples 44 to 48 and Comparative Examples 21 to 25, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 10, also in each of various combinations of compositions of the nanocrystal powders and types and

TABLE 10

| | Mother Powder Composition | Heat Treatment Condition | Crystallinity after Heat Treatment (%) | Crystal Grain Diameter (nm) | Additive Powder: Type | Additive Powder: Addition Amount (wt %) | Magnetic Property: μ (—) | Magnetic Property: Pcv ($kW/m^3$) |
|---|---|---|---|---|---|---|---|---|
| Example 44 | $Fe_{80.9}Si_3B_6P_{8.5}Cr_{1.0}Cu_{0.6}$ | 425° C. × 30 min, 3° C./min | 41 | 29 | Fe—Si—Cr | 50 | 36 | 1880 |
| Comparative Example 21 | | | | | — | 0 | 23 | 2900 |
| Example 45 | $Fe_{81.4}Si_3B_5P_9Cr_{1.0}Cu_{0.6}$ | 425° C. × 30 min, 3° C./min | 43 | 27 | Fe—Cr | 70 | 35 | 1903 |
| Comparative Example 22 | | | | | — | 0 | 23 | 3000 |
| Example 46 | $Fe_{81.9}Si_{3.5}B_{4.5}P_{8.5}Cr_{1.0}Cu_{0.6}$ | 425° C. × 30 min, 3° C./min | 50 | 30 | Fe—Cr | 20 | 31 | 2333 |
| Comparative Example 23 | | | | | — | 0 | 21 | 3200 |
| Example 47 | $Fe_{82.7}Si_4B_8P_4Cr_{1.0}Cu_{0.3}$ | 400° C. × 30 min, 3° C./min | 35 | 44 | Carbonyl Iron Powder | 60 | 33 | 2450 |
| Comparative Example 24 | | | | | — | 0 | 21 | 3700 |
| Example 48 | $Fe_{73.5}Si_{15.5}B_7Nb_3Cu_1$ | 525° C. × 30 min, 2° C./min | 62 | 18 | Pure Iron Powder | 40 | 40 | 1810 |
| Comparative Example 25 | | | | | — | 0 | 25 | 2870 |

In each of Examples 44 to 48 and Comparative Examples 21 to 25, as the mother powder, a powder produced by the water atomize method and having an average particle diameter of 40 μm was used. The mother powder was heated in amounts of the additive powders, it can be understood that the powder core having excellent magnetic properties with a high initial permeability μ and a low core loss Pcv was obtained. That is, in the present invention, by mixing the nanocrystal powder having a predetermined nanocrystallization state (crystallinity, crystal grain diameter) and a predetermined additive powder (Vickers hardness, amount), the excellent magnetic properties can be achieved.

Examples 49 to 55, Comparative Examples 26 to 32

Examples 49 to 55 and Comparative examples 26 to 32 are powder cores produced by substitution for a part of Fe elements in the nanocrystal powder. Examples 49 to 55 were produced by the method for manufacturing a powder core shown in FIG. 2. Comparative Examples 26 to 32 were produced in the same manner as Examples 49 to 55 except for using no additive powder (step S22). Table 11 shows various production conditions of Examples 49 to 55 and Comparative Examples 26 to 32 and evaluation results of magnetic properties of them.

TABLE 11

| | Mother Powder Compostion | Heat Treatment Condition | Crystallinity after Heat Treatment (%) | Crystal Grain Diameter (nm) | Additive Powder Type | Additive Powder Addtion Amount (wt %) | Magnetic Property μ (—) | Magnetic Property Pcv (kW/m$^3$) |
|---|---|---|---|---|---|---|---|---|
| Example 49 | $Fe_{80.4}Si_2B_8P_6Cu_{0.6}Co_3$ | 430° C. × 30 min, 30° C./min | 58 | 32 | Fe—3Si | 75 | 35 | 1831 |
| Comparative Example 26 | | | | | — | 0 | 25 | 3210 |
| Example 50 | $Fe_{81.4}Si_2B_8P_6Cu_{0.6}Ni_2$ | 420° C. × 30 min, 30° C./min | 50 | 35 | Fe—3Si | 40 | 33 | 1943 |
| Comparative Example 27 | | | | | — | 0 | 23 | 3360 |
| Example 51 | $Fe_{80.9}Si_3B_8P_7Cu_{0.6}Mo_{0.5}$ | 420° C. × 30 min, 30° C./min | 47 | 33 | Fe—Cr | 15 | 30 | 2051 |
| Comparative Example 28 | | | | | — | 0 | 24 | 2950 |
| Example 52 | $Fe_{81.1}Si_3B_8P_7Cu_{0.6}Mn_{0.3}$ | 420° C. × 30 min, 30° C./min | 48 | 31 | Fe—6.5Si | 40 | 34 | 2032 |
| Comparative Example 29 | | | | | — | 0 | 24 | 3300 |
| Example 53 | $Fe_{79.9}Si_3B_6P_{8.5}Cr_1Cu_{0.6}C_1$ | 430° C. × 30 min, 10° C./min | 37 | 26 | Fe—Si—Cr | 15 | 29 | 2413 |
| Comparative Example 30 | | | | | — | 0 | 24 | 3015 |
| Example 54 | $Fe_{80.8}Si_3B_6P_{8.5}Cr_1Cu_{0.6}Al_{0.1}$ | 420° C. × 30 min, 10° C./min | 45 | 27 | Fe—Si—Cr | 40 | 31 | 2220 |
| Comparative Example 31 | | | | | — | 0 | 23 | 3410 |
| Example 55 | $Fe_{80.89}Si_3B_6P_{8.5}Cr_1Cu_{0.6}Ti_{0.01}$ | 420° C. × 30 min, 10° C./min | 47 | 27 | Fe—Ni | 60 | 35 | 2460 |
| Comparative Example 32 | | | | | — | 0 | 23 | 3480 |

In each of Examples 49 to 55 and Comparative Examples 26 to 32, as the mother powder, a powder produced by the water atomize method and having an average particle diameter of 35 μm was used. The mother powder was heated in an inert atmosphere by use of an infrared heating device, and then cooled by air to obtain a nanocrystal powder. Temperature rising rates, holding temperatures and holding times in heat-treatment processes for the mother powders were as described in Table 11. Crystallinities and crystal grain sizes of the nanocrystal powders analyzed by XRD were also as described in Table 11.

In each of Examples 49 to 55 and Comparative Examples 26 to 32, the nanocrystal powder and the additive powder (malleable powder) were mixed at a ratio described in Table 11 to obtain a mixed powder. Fr—Cr of the additive powder was the same as that of Example 36 described in Table 7. Fe—Ni, Fe-3Si, Fe—Si—Cr and Fe-6.5Si were the same as those of Example 1 and Examples 3 to 5 described in Table 1. In each of Comparative Examples 26 to 32, the nanocrystal powder was directly used without adding an additive powder. As the binder, a solid silicone resin was used. The binder was weighed to 3.0% in weight ratio to the mixed powder (Examples 49 to 55) or the nanocrystal powder (Comparative Examples 26 to 32) and used after being stirred and dissolved in IPA (isopropyl alcohol). The grain size control after mixing the binder was carried out by passing the mixture through a mesh having an opening of 500 μm. The granulated powder of 4.5 g was put in a mold and molded by a hydraulic auto press machine at a pressure of 780 MPa, and thereby a green compact having a cylindrical shape with an external diameter of 20 mm and an internal diameter of 13 mm was produced. The green compact obtained was introduced in a thermostat to place it in an inert atmosphere, and the temperature in the thermostat was set to 150° C. and held for 2 hours.

In order to evaluate magnetic properties of Examples 49 to 55 and Comparative Examples 26 to 32, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 11, also in a case where various elements were substituted for a part of Fe elements in the nanocrystal powder, it can be understood that, by adding the malleable powder, the initial permeability μ became equal to 25 or more, the core loss Pcv became equal to 2500 kW/m$^3$ or less, and a powder core having excellent magnetic properties was obtained.

Examples 56 and 57, Comparative Example 33

Example 56 and Comparative example 33 are powder cores produced by substitution of 0 elements for a part of Fe elements in the nanocrystal powder. Example 57 is a powder core produced without substitution of 0 elements for a part of Fe elements. Examples 56 and 57 were produced by the method for manufacturing a powder core shown in FIG. 2. Comparative Example 33 was produced in the same manner as Example 56 except for using no additive powder (step S22). Table 12 shows various production conditions of Examples 56 and 57 and Comparative Example 33 and evaluation results of magnetic properties of them.

In each of Examples 56 and 57 and Comparative Example 33, as the mother powder, a $Fe_{80.9}Si_3B_7P_{8.5}Cu_{0.6}$ powder produced by the water atomize method and having an average particle diameter of 30 μm was used. Regarding each of Example 56 and Comparative Example 33, the mother powder was heated in the air by use of an infrared heating device, and then cooled by air to obtain a nanocrystal powder. Regarding Example 57, the mother powder was heated in an inert atmosphere to obtain a nanocrystal powder. A temperature rising rates was 10° C. par minute in each case, a holding temperature was 425° C. and a holding time was 30 minutes. In Example 56 and Comparative Example 33, owing to heating in the air, oxide films can be formed on surfaced of the nanocrystal powder. As measured by an oxygen/nitrogen analyzing device, an oxygen content of the nanocrystal powder was 4,800 ppm. Assuming a ratio of elements other than oxygen is not changed, the composition of the powder after nanocrystallization is $Fe_{79.70}Si_{2.96}B_{6.90}P_{8.37}CU_{0.59}O_{1.48}$. A crystallinity of the nanocrystal powder analyzed by XRD was equal to 48%, and a crystal grain diameter was equal to 27 nm.

TABLE 12

| | Mother Powder Composition | Heat Treatment Condition | Crystallinity after Heat Treatment (%) | Crystal Grain Diameter (nm) | Additive Powder Type | Additive Powder Addition Amount (wt %) | Magnetic Property μ (—) | Magnetic Property Pcv (kW/m$^3$) |
|---|---|---|---|---|---|---|---|---|
| Example 56 | $Fe_{79.70}Si_{2.96}B_{6.9}P_{8.37}Cu_{0.59}O_{1.48}$ | 425° C. × 30 min, 10° C./min. air | 48 | 27 | Carbonyl Iron Powder | 50 | 38 | 1421 |
| Comparative Example 33 | | | | | — | 0 | 19 | 2870 |
| Example 57 | $Fe_{80.9}Si_3B_7P_{8.5}Cu_{0.6}$ | 425° C. × 30 min, 10° C./min, inert gas | | | Carbonyl Iron Powder | 50 | 40 | 1568 |

In each of Examples 56 and 57, the nanocrystal powder and the additive powder (malleable powder) were mixed at a ratio described in Table 12 to obtain a mixed powder. A carbonyl iron powder was the same as that of Example 2 described in Table 1. In Comparative Example 33, the nanocrystal powder was directly used without adding an additive powder. The binder was added to the mixed powder (Examples 56 and 57) or the nanocrystal powder (Comparative Example 33) at a weight ratio of 2.5%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 980 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Examples 56 and 57 and Comparative Example 33, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 12, also in a case where 0 elements were substituted for a part of Fe elements in the nanocrystal powder, it can be understood that, by adding the malleable powder, the initial permeability μ became equal to 25 or more, the core loss Pcv became equal to 2500 kW/m$^3$ or less, and a powder core having excellent magnetic properties was obtained. Moreover, according to comparison between Example 56 and Example 57, in Example 56, by forming oxidation films on surfaces of the powder or substituting 0 elements for a part of Fe elements, it can be said that the core loss Pcv was reduced.

Example 58, Comparative Example 34

Example 58 and Comparative example 34 are powder cores produced by substitution of Sn elements for a part of Fe elements in the nanocrystal powder. Example 58 was produced by the method for manufacturing a powder core shown in FIG. 2. Comparative Example 34 was produced in the same manner as Example 58 except for using no additive powder (step S22). Table 13 shows various production conditions of Example 58 and Comparative Example 34 and evaluation results of magnetic properties of them.

TABLE 13

| | Mother Powder Composition | Heat Treatment Condition | Crystallinity after Heat Treatment (%) | Crystal Grain Diameter (nm) | Additive Powder Type | Additive Powder Addition Amount (wt %) | Magnetic Property μ (—) | Magnetic Property Pcv (kW/m³) |
|---|---|---|---|---|---|---|---|---|
| Example 58 | $Fe_{80.4}Si_3B_6P_{8.5}Cu_{0.6}Sn_{1.5}$ | 425° C. × 30 min, 5° C./min | 40 | 30 | Fe—Ni | 75 | 40 | 2390 |
| Comparative Example 34 | | | | | — | 0 | 24 | 3302 |

In each of Example 58 and Comparative Example 34, as the mother powder, a $Fe_{80.4}Si_3B_6P_{8.5}Cu_{0.6}Sn_{1.5}$ powder produced by pulverizing a strip formed by a single roll liquid quenching method and having an average particle diameter of 70 μm was used. Specifically, materials of Fe, Fe—Si, Fe—B, Fe—P, Cu and Sn were weighted to obtain an alloy composition shown in Table 13 and melted by high frequency melting. Then, the alloy composition melt was processed in the air by a single roll melt quenching method to produce a continuous strip with a thickness of 25 μm, a width of 5 mm and a length 30 m. The strip obtained of 20 g was put into a plastic bag and roughly crushed by hand, and then fully pulverized by use of a ball mill made of metal. The pulverized powder obtained was passed through a mesh having an opening of 150 μm to produce amorphous powder. The mother powder was heated up to 425° C. at a temperature rising rate of 5° C. per minute in an inert atmosphere by use of an infrared heating device, held for 30 minutes, and then cooled by air to obtain a nanocrystal powder. A crystallinity of the nanocrystal powder analyzed by XRD was equal to 40%, and a crystal grain diameter was equal to 30 nm.

In each of Example 58 and Comparative Example 34, the nanocrystal powder and the additive powder (malleable powder) were mixed at a ratio described in Table 13 to obtain a mixed powder. Fe—Ni was the same as that of Example 1 described in Table 1. In Comparative Example 34, the nanocrystal powder was directly used without adding an additive powder. As the binder, a solid silicone resin was used. The binder was added to the mixed powder (Example 58) or the nanocrystal powder (Comparative Example 34) at a weight ratio of 2.5%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 980 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Example 58 and Comparative Example 34, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 13, also in a case where Sn elements were substituted for a part of Fe elements in the nanocrystal powder, it can be understood that, by adding the malleable powder, the initial permeability μ became equal to 25 or more, the core loss Pcv became equal to 2500 kW/m³ or less, and a powder core having excellent magnetic properties was obtained. Moreover, also in a strip pulverization powder was used as the nanocrystal powder, it can be said that excellent magnetic properties were achieved.

Examples 59 and 60, Comparative Example 35

Example 59 is powder core produced by use of two types of powders, which are different from each other in composition and grain size distribution, as the malleable powder used in step S22. Example 60 is a powder core produced by mixing a third powder (additive powder 2) which is different from both of the nanocrystal powder and the malleable powder. Comparative Example 35 is a powder core produced from only a nanocrystal powder without mixing with an additive powder. Examples 59 and 60 were produced by the method for manufacturing a powder core shown in FIG. 2. Comparative Example 35 was produced in the same manner as Examples 59 and 60 except for using no additive powder (step S22). Table 14 shows various production conditions of Examples 59 and 60 and Comparative Example 35 and evaluation results of magnetic properties of them.

TABLE 14

| | Mother Powder Composition | Heat Treatment Condition | Crystallinity after Heat Treatment (%) | Crystal Grain Diameter (nm) | Additive Powder 1 Type | Additive Powder 1 Addition Amount (wt %) | Additive Powder 2 Type | Additive Powder 2 Addition Amount (wt %) | Magnetic Property μ (—) | Magnetic Property Pcv (kW/m³) |
|---|---|---|---|---|---|---|---|---|---|---|
| Example 59 | $Fe_{80.15}Si_4B_8P_{6.5}Cr_{1.0}Cu_{0.35}$ | 450° C. × 30 min, 3° C./min | 38 | 41 | Fe—Si—Cr | 20 | Carbonyl Iron | 10 | 50 | 2354 |
| Example 60 | | | | | Carbonyl Iron Powder | 42 | Silica Powder | 3 | 33 | 2005 |
| Comparative Example 35 | | | | | — | 0 | — | 0 | 21 | 3230 |

In each of Examples 59 and 60 and Comparative Example 35, as the mother powder, a $Fe_{80.15}Si_4B_8P_{6.5}Cr_1CU_{0.35}$ powder produced by the water atomize method and having an average particle diameter of 55 μm was used. The mother powder was heated up to 450° C. at a temperature rising rate of 3° C. per minute in an inert atmosphere by use of an infrared heating device, held for 30 minutes, and then cooled by air to obtain a nanocrystal powder. A crystallinity of the nanocrystal powder analyzed by XRD was equal to 38%, and a crystal grain diameter was equal to 41 nm.

In each of Examples 59 and 60, the nanocrystal powder and two types of the additive powders were mixed at a ratio described in Table 14 to obtain a mixed powder. Among the additive powders, a silica powder had a particle diameter of 30 nm, and Fe—Si—Cr and a carbonyl iron powder were the same as those of Example 4 and Example 2 described in Table 1, respectively. In Comparative Example 35, the nanocrystal powder was directly used without adding an additive powder. The binder was added to the mixed powder (Examples 59 and 60) or the nanocrystal powder (Comparative Example 35) at a weight ratio of 2.5%, and then they were stirred and mixed. As the binder, a phenol resin was used. The grain size control after mixing the binder was carried out by passing the mixture through a mesh having an opening of 500 μm. The granulated powder of 2.0 g was put in a mold and molded by a hydraulic auto press machine at a pressure of 980 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

In order to evaluate magnetic properties of Examples 59 and 60 and Comparative Example 35, initial permeabilities μ were measured at a frequency of 1 MHz by use of an impedance analyzer. Moreover, using a B-H analyzer, core losses Pcv were also measured at a frequency of 300 kHz and a magnetic flux density of 50 mT.

From Table 14, also in each of a case (Example 59) where the two types of powders different from each other in composition and grain size distribution were used as the malleable powder and a case (Example 60) where the third powder in addition to the nanocrystal powder and the malleable powder was mixed, it can be understood that the initial permeability μ became equal to 25 or more, the core loss Pcv became equal to 2500 kW/m$^3$ or less, and excellent magnetic properties were achieved.

Examples 61 to 75

Examples 61 to 75 are powder cores produced by use of mother powders having different compositions. Examples 61 to 75 were produced by the method for manufacturing a powder core shown in FIG. 2. As the mother powder, a $Fe_{(100-a-b-c-x-y-z)}Si_aB_bP_cCr_xCu_z$ powder produced by the water atomize method and having an average particle diameter of 50 μm was used. Composition ratios in Examples 61 to 75 were as shown in Table 15. Additionally, this powder corresponds to a powder not including Nb (y=0) among the amorphous powders of the embodiment of the present invention.

Examples 61 to 75 were produced as the follows. First, in the powder heat-treatment process P1, the mother powder was heated up to 400° C.-475° C. at a temperature rising rate of 30° C. per minute in an inert atmosphere by use of an infrared heating device, held for 10 minutes, and cooled by air to obtain a nanocrystal powder. The core manufacturing process P2 was carried out in the same manner as Examples 1 to 5, where a type of the additive powder was as shown in Table 15, and addition amount thereof was 20 wt %. At that time, as the binder, a phenol resin was used. A ratio of the binder to the mixed powder was 2.5% in weight ratio. The granulated powder of 2.0 g was put in a mold and molded by a hydraulic auto press machine at a pressure of 245 MPa, and thereby a green compact having a cylindrical shape with an external diameter of 13 mm and an internal diameter of 8 mm was produced. The green compact obtained was introduced in a thermostat to place it in an inert atmosphere, and the temperature in the thermostat was set to 160° C. and held for 4 hours.

Regarding Examples 61 to 75, saturation magnetic flux densities Bs were measured by use of a B-H analyzer. Table 15 shows Measurement results of Examples 61 to 75 along with the composition ratios thereof.

TABLE 15

| | Composition Range (at %) | | | | | | | Magnetic |
|---|---|---|---|---|---|---|---|---|
| | Fe | Si | B | P | Cr | Cu | Additive | Property |
| | — | 0 ≤ a ≤ 8 | 4 ≤ b ≤ 13 | 1 ≤ c ≤ 11 | 0 ≤ x ≤ 3 | 0.2 ≤ z ≤ 1.4 | Powder Type | Bs(T) |
| Example 61 | 81.3 | 0 | 10 | 7 | 1 | 0.7 | Fe—Si—Cr | 1.27 |
| Example 62 | 80.6 | 8 | 9 | 2 | 0 | 0.4 | Fe—Si—Cr | 1.29 |
| Example 63 | 81.8 | 2 | 13 | 3 | 0 | 0.2 | Fe—Si—Cr | 1.30 |
| Example 64 | 74.5 | 9 | 10 | 5 | 0 | 1.5 | Fe—Si—Cr | 1.03 |
| Example 65 | 83.6 | 2 | 11 | 2 | 0 | 1.4 | Fe—Si—Cr | 1.37 |
| Example 66 | 82.4 | 5 | 4 | 8 | 0 | 0.6 | Fe—Si—Cr | 1.32 |
| Example 67 | 80.9 | 5 | 3 | 9 | 1 | 0.1 | Fe—Si—Cr | 1.19 |
| Example 68 | 78.5 | 3 | 14 | 0 | 4 | 0.5 | Fe—Si—Cr | 1.02 |
| Example 69 | 82.4 | 4 | 9 | 1 | 3 | 0.6 | Fe—Si—Cr | 1.20 |
| Example 70 | 80.2 | 3 | 5 | 11 | 0 | 0.8 | Fe—Si—Cr | 1.21 |
| Example 71 | 79.3 | 2 | 5 | 12 | 1 | 0.7 | Fe—Si—Cr | 1.14 |
| Example 72 | 82.4 | 5 | 4 | 8 | 0 | 0.6 | Fe—Ni | 1.34 |
| Example 73 | 82.4 | 5 | 4 | 8 | 0 | 0.6 | Fe—6.5Si | 1.33 |
| Example 74 | 82.4 | 5 | 4 | 8 | 0 | 0.6 | Carbonyl Iron Powder | 1.44 |
| Example 75 | 79.3 | 2 | 5 | 12 | 1 | 0.7 | Fe—Ni | 1.16 |

As understood from Table 15, Examples 61 to 63, 65, 66, 69, 70, and 72 to 74 had high saturation magnetic flux densities Bs which were equal to 1.20 T or more. In other words, the saturation magnetic flux density Bs showed a high value equal to 1.20 T or more in a composition range of 0≤a≤8 at %, 4≤b≤13 at %, 1≤c≤11 at %, 0≤x≤3 at % and 0.2≤y≤1.4 at %. Thus, Examples 61 to 63, 65, 66, 69, 70 and 72 to 74 had excellent magnetic properties.

Although the specific explanation about the embodiments of the present invention is made above referring to the examples, the present invention is not limited thereto but susceptible of various modifications and alternative forms without departing from the spirit of the invention. That is, the present invention includes various modifications and alternative forms which will be naturally made by those skilled in the art.

INDUSTRIAL APPLICABILITY

Although, in the embodiments mentioned above, the description is made about the powder core, the core integrated type inductor and the manufacturing method of them, the present invention is applicable to other magnetic parts (magnetic sheet and so on) and manufacturing methods of them.

The present invention is based on a Japanese patent application of JP2017-190682 filed with the Japan Patent Office on Sep. 29, 2017, the content of which is incorporated herein by reference.

REFERENCE SIGNS LIST

- 1 Inductor
- 2 Coil
- 3 Powder Core
- 4*a*, 4*b* Terminal Portion
- 10 DSC Curve
- 11 First Peak
- 12 First Rising Edge Portion
- 15 Second Peak
- 16 Second Rising Portion
- 20, 21 Base Line
- 32 First Rising Tangent
- 42 Second Rising Tangent

The invention claimed is:

1. A method for manufacturing a dust core, the method comprising:

heat-treating an amorphous soft magnetic alloy powder to obtain a nanocrystal powder;

obtaining a granulated powder from the nanocrystal powder, a malleable powder, and a binder;

pressure-molding the granulated powder to obtain a green compact; and curing the binder by heat-treating the green compact at a temperature which is equal to or higher than the curing initiation temperature of the binder and lower than the crystallization initiation temperature of the amorphous soft magnetic alloy powder, wherein a nanocrystallinity of the nanocrystal powder is equal to 30% or more, wherein the amorphous soft magnetic alloy powder is represented by a composition formula of $Fe_{(100-a-b-c-x-y-z-v)}Si_aB_bP_cCr_xNb_yCU_zC_v$, where 0≤a≤17 at %, 6≤b≤15 at %, 0≤c≤15 at %, 0≤x+y≤5 at %, 0.2≤z≤2 at %, and v≤1 at %, wherein the malleable powder comprises one selected from carbonyl iron powder, iron-silicon alloy powder, and iron-silicon-chromium alloy powder, and wherein the dust core has a core loss Pcv which is equal to 2500 kW/m$^3$ or less at a frequency of 300 kHz and a magnetic flux density of 50 mT.

2. The method for manufacturing the dust core as recited in claim 1, wherein:

the Vickers hardness of the malleable powder is less than 450 Hv; and a particle diameter ratio of the malleable powder to the nanocrystal powder is equal to or smaller than one.

3. The method for manufacturing the dust core as recited in claim 1, wherein an addition amount of the malleable powder is equal to 10 wt % or more and equal to 90 wt % or less.

4. The method for manufacturing the dust core as recited in claim 1, wherein a nanocrystal grain diameter of the nanocrystal powder is smaller than 45 nm.

5. The method for manufacturing the dust core as recited in claim 1, wherein the Vickers hardness of the malleable powder is less than 250 Hv.

6. The method for manufacturing the dust core as recited in claim 1, wherein an addition amount of the malleable powder is equal to 20 wt % or more and equal to 80 wt % or less.

7. The method for manufacturing the dust core as recited in claim 1, wherein:

the nanocrystallinity of the nanocrystal powder is equal to 45% or more; and a nanocrystal grain diameter in the nanocrystal powder is equal to or smaller than 35 nm.

8. The method for manufacturing the dust core as recited in claim 1, wherein a particle diameter ratio of the malleable powder to the nanocrystal powder is equal to or smaller than 0.25.

9. The method for manufacturing the dust core as recited in claim 1, wherein the composition formula meets 0≤a≤8 at %, 6≤b≤13 at %, 1≤c≤11 at %, 0≤x≤3 at %, y=0 at %, 0.2≤z≤1.4 at %, and v≤1 at %.

10. A method for manufacturing a dust core, the method comprising:

heat-treating an amorphous soft magnetic alloy powder to obtain a nanocrystal powder;

obtaining a granulated powder from the nanocrystal powder, a malleable powder, and a binder;

pressure-molding the granulated powder to obtain a green compact; and curing the binder by heat-treating the green compact at a temperature which is equal to or higher than the curing initiation temperature of the binder and lower than the crystallization initiation temperature of the amorphous soft magnetic alloy powder, wherein a nanocrystallinity of the nanocrystal powder is equal to 30% or more, wherein the amorphous soft magnetic alloy powder is represented by a composition formula of $Fe_{(100-a-b-c-x-y-z-v-w)}Si_aB_bP_cCr_xNb_yCu_zC_yA_w$, where 0≤a≤17 at %, 6≤b≤15 at %, 0≤c≤15 at %, 0≤x+y≤5 at %, 0.2≤z≤2 at %, v≤1 at %, and w≤3 at %, and wherein A is one or more elements selected from Co, Ni, Zn, Zr, Hf, Mo, Ta, W, Ag, Au, Pd, K, Ca, Mg, Sn, Ti, V, Mn, Al, S, O, N, Bi and rare earth elements, wherein the malleable powder comprises one selected from carbonyl iron powder, iron-silicon alloy powder, and iron-silicon-chromium alloy powder, and wherein the dust core has a core loss Pcv which is equal to 2500 $kW/m^3$ or less at a frequency of 300 kHz and a magnetic flux density of 50 mT.

11. A dust core which is manufactured by the method for manufacturing the dust core as recited in claim 1, the dust core being formed from (i) the nanocrystal powder obtained by heating the amorphous soft magnetic alloy powder, (ii) the malleable powder, and (iii) the binder, wherein:

when assuming a cross-section which divides the dust core in half, the cross-section has a cross sectional area of 10 $mm^2$ or more, in the cross section, a crystal grain diameter ratio of a nanocrystal positioned at a depth of 0.1 mm from a surface of the dust core to a nanocrystal positioned at a center of the dust core is less than 1.3, a nanocrystallinity of the nanocrystal powder is equal to 30% or more, the amorphous soft magnetic alloy powder is represented by a composition formula of $Fe_{(100-a-b-c-x-y-z-v-w)}Si_aB_bP_cCr_xNb_yCu_zC_y$, wherein $0 \leq a \leq 17$ at %, $6 \leq b \leq 15$ at %, $0 \leq c \leq 15$ at %, $0 \leq x+y \leq 5$ at %, $0.2 \leq z \leq 2$ at %, and $v \leq 1$ at %, the malleable powder comprises one selected from carbonyl iron powder, iron-silicon alloy powder, and iron-silicon-chromium alloy powder, and the dust core has a core loss Pcv which is equal to 2500 $kW/m^3$ or less at a frequency of 300 kHz and a magnetic flux density of 50 mT.

12. An inductor comprising:

the dust core as recited in claim 11, and a coil built in the dust core.

* * * * *